US011068922B2

(12) United States Patent
Shiffert et al.

(10) Patent No.: US 11,068,922 B2
(45) Date of Patent: *Jul. 20, 2021

(54) SYSTEMS, METHODS, AND COMPUTER-READABLE MEDIA FOR A CUSTOMIZABLE REDEMPTION HEADER FOR MERCHANT OFFERS ACROSS BROWSER INSTANCES

(71) Applicant: RetailMeNot, Inc., Austin, TX (US)

(72) Inventors: Nicholas James Shiffert, Austin, TX (US); Jagjit Singh Bath, Austin, TX (US); Michael Paul Cravey, Austin, TX (US); Gregory Peter Militello, Austin, TX (US)

(73) Assignee: RETAILMENOT, INC., Austin, TX (US)

( * ) Notice: Subject to any disclaimer, the term of this patent is extended or adjusted under 35 U.S.C. 154(b) by 294 days.

This patent is subject to a terminal disclaimer.

(21) Appl. No.: 15/849,050

(22) Filed: Dec. 20, 2017

(65) Prior Publication Data

US 2018/0114246 A1    Apr. 26, 2018

Related U.S. Application Data

(63) Continuation of application No. 13/839,066, filed on Mar. 15, 2013, now Pat. No. 9,881,315.
(Continued)

(51) Int. Cl.
*G06Q 30/02* (2012.01)
*H04L 29/08* (2006.01)

(52) U.S. Cl.
CPC ......... *G06Q 30/0222* (2013.01); *G06Q 30/02* (2013.01); *G06Q 30/0225* (2013.01);
(Continued)

(58) Field of Classification Search
CPC ................ G06Q 30/0222; G06Q 30/0239
(Continued)

(56) References Cited

U.S. PATENT DOCUMENTS 9,037,963 B1    5/2015 Chandi et al.
2009/0030794 A1    1/2009 Scheflan et al.
(Continued)

OTHER PUBLICATIONS

"Exploting xdLocalStorage (localStorage and postMessage)", GrimBlog, retrieved from the Internet <https://grimhacker.com/2020/04/02/exploiting-xdlocalstorage-localstorage-and-postmessage/>, Apr. 2, 2020, 22 pages.
(Continued)

*Primary Examiner* — Azam A Ansari
(74) *Attorney, Agent, or Firm* — Womble Bond Dickinson (US) LLP

(57) ABSTRACT

Systems, computer-implemented methods, and computer-readable media for a customizable redemption header for merchant offers, such as online coupons, across browser instances are provided. In some embodiments, a user may open a merchant website in a first browser instance executing on a user device. An offers website may provide offers, such as online coupons, in a second browser instance executing on a user device. When a user selects an offer, an offer identifier may be stored in a browser-accessible storage device. The modification to the browser-accessible storage may be detected and a customizable redemption header having an offer redemption identifier, e.g., a coupon code, and instructions may be provided on the merchant webpage in response to the detection. Additionally, the customizable redemption header may provide user feedback requests upon submission of the coupon code.

16 Claims, 20 Drawing Sheets

Related U.S. Application Data

(60) Provisional application No. 61/707,527, filed on Sep. 28, 2012, provisional application No. 61/665,740, filed on Jun. 28, 2012, provisional application No. 61/658,408, filed on Jun. 12, 2012, provisional application No. 61/658,404, filed on Jun. 11, 2012, provisional application No. 61/658,387, filed on Jun. 11, 2012.

(52) U.S. Cl.
CPC ..... *G06Q 30/0239* (2013.01); *G06Q 30/0242* (2013.01); *G06Q 30/0255* (2013.01); *G06Q 30/0256* (2013.01); *G06Q 30/0267* (2013.01); *G06Q 30/0269* (2013.01); *H04L 67/02* (2013.01)

(58) Field of Classification Search
USPC ........................................ 705/14.39
See application file for complete search history.

(56) References Cited

U.S. PATENT DOCUMENTS

| | | | |
|---|---|---|---|
| 2011/0010235 A1* | 1/2011 | Kenny | G06Q 30/02 705/14.23 |
| 2011/0153401 A1 | 6/2011 | Jellema et al. | |
| 2011/0208575 A1* | 8/2011 | Bansal | G06Q 30/02 705/14.25 |

OTHER PUBLICATIONS

Canadian Office Action dated Feb. 27, 2020 in Canadian Application No. 2,876,006 (6 pages).
Webarchive of CouponsHelper Tutorial https://web.archive.org/web/20120421032445/http://www.youtube.com/watch?v=SrYCmKdvzE4 Dec. 12, 2011 (4 pages).
Webarchive of CouponsHelper Firefox Addon https://web.archive.org/web/20120503055113/https://addons.mozilla.org/en-US/firefox/addon/couponshelper/, May 3, 2012 (6 pages).
CouponsHelper—Free Firefox Add On for Coupon Codes https://www.youtube.com/watch?v=TIL_44HRpk8, Jul. 11, 2011 (3 pages).
Office Action for Related Canadian Application No. 2,876,007, dated Dec. 18, 2019, pp. 1 to 3.
Examiner's Report for Canadian Application No. 2,876,007 dated May 17, 2021, 4 pages.

* cited by examiner

SYSTEMS, METHODS, AND COMPUTER-READABLE MEDIA FOR A CUSTOMIZABLE REDEMPTION HEADER FOR MERCHANT OFFERS ACROSS BROWSER INSTANCES

CROSS-REFERENCE TO RELATED APPLICATIONS

The present application is a continuation of U.S. patent application Ser. No. 13/839,066, filed 15 Mar. 2013, which claims the benefit of each of the following U.S. provisional patent, each of which is hereby incorporated by reference in its entirety for all purposes: provisional application 61/707,527, filed Sep. 28, 2012; provisional application 61/665,740, filed Jun. 28, 2012; provisional application 61/658,408, filed Jun. 12, 2012; provisional application 61/658,404, filed Jun. 11, 2012; and provisional application 61/658,387, filed Jun. 11, 2012.

BACKGROUND OF THE INVENTION

1. Field of the Invention

This invention relates generally to merchant offers for goods and service and, more particularly, to redemption of certain offers such as online coupons.

2. Description of the Related Art

Offer-discovery systems provide a service by which merchants inform customers of offers, for example deals (like discounts, favorable shipping terms, or rebates) or coupons (like printable coupons for in-store use or coupon codes for use online). Typically, the systems store information about offers from a relatively large number of merchants and provide an interface by which customers can identify offers in which the customer is interested. Merchants have found the offer-discovery systems to be a relatively effective form of marketing, as cost-sensitive consumers are drawn to such systems due to the system's relatively comprehensive listings of offers. Such offers may include coupons, such as traditional in-store coupons, and online coupons typically obtained via the Internet, such as from merchant websites, e-mail distributions, or other sources. To use an online coupon, a customer typically provides an identifier, such as a coupon code, when purchasing goods and services from a merchant's online store. However, a customer may forget about the existence of the coupon and, as a result, fail to take advantage of the offer presented by the coupon. Additionally, it may be challenging for a customer to remember the identifier presented by the coupon and to use the online coupon in the manner specified by the online store. Additionally, the advent of smaller computing devices having different or limited interfaces may increase the challenges faced by customers attempting to use online coupons.

SUMMARY OF THE INVENTION

Various embodiments of systems, computer-implemented methods, and computer-readable media for a customizable redemption header for merchant offers, such as online coupons, across browser instances are provided. In some embodiments, a computer-implemented method is provided that includes providing a webpage element of a merchant webpage in a first browser instance and detecting a modification to a browser-accessible storage item modified by a second browser instance, the modification based on a user selection of an offer from an offers webpage provided in the second browser instance and the offer associated with a selected offer redemption identifier and a selected merchant. The method further includes reading an offer identifier associated with the selected offer from the browser-accessible storage item and determining whether the selected merchant associated with the offer identifier matches a merchant associated with the merchant website. The method also includes inserting, by one or more processors, a redemption header in the webpage element of the merchant webpage if the selected merchant matches the merchant associated with the merchant website. The redemption header includes the selected offer redemption identifier associated with the selected offer, the redemption header being displayed on the merchant webpage. Finally, the method includes providing, by one or more processors, the webpage element of the merchant webpage as an empty webpage element if the selected merchant does not match the merchant associated with the merchant website and receiving, by one or more processors, a selection of one of the plurality of offers, the selected offer being associated with a selected offer redemption identifier and a selected merchant.

Additionally, in some embodiments, a transitory computer-readable medium having executable computer code stored thereon is provided. The executable computer code includes instructions that, when executed, cause one or more processors to perform the following: providing a webpage element of a merchant webpage in a first browser instance and detecting a modification to a browser-accessible storage item modified by a second browser instance, the modification based on a user selection of an offer from an offers webpage provided in the second browser instance and the offer associated with a selected offer redemption identifier and a selected merchant. The executable computer code further includes instructions that perform the following: reading an offer identifier associated with the selected offer from the browser-accessible storage item and determining whether the selected merchant associated with the offer identifier matches a merchant associated with the merchant website. Additionally, the executable computer code further includes instructions that perform the following: inserting, by one or more processors, a redemption header in the webpage element of the merchant webpage if the selected merchant matches the merchant associated with the merchant website. The redemption header includes the selected offer redemption identifier associated with the selected offer, the redemption header being displayed on the merchant webpage. Finally, the executable computer code further includes instructions that perform the following: providing, by one or more processors, the webpage element of the merchant webpage as an empty webpage element if the selected merchant does not match the merchant associated with the merchant website and receiving, by one or more processors, a selection of one of the plurality of offers, the selected offer being associated with a selected offer redemption identifier and a selected merchant.

Further, in some embodiments, a system is providing having one or more processors and a non-transitory tangible computer-readable memory communicatively coupled to the one or more processors. The transitory computer-readable memory includes executable computer code stored thereon is provided. The executable computer code includes instructions that, when executed, cause one or more processors to perform the following: providing a webpage element of a merchant webpage in a first browser instance and detecting a modification to a browser-accessible storage item modified by a second browser instance, the modification based on a user selection of an offer from an offers webpage provided in the second browser instance and the offer associated with a selected offer redemption identifier and a selected merchant. The executable computer code further includes instructions that perform the following: reading an offer identifier associated with the selected offer from the browser-accessible storage item and determining whether the selected merchant associated with the offer identifier matches a merchant associated with the merchant website. Additionally, the executable computer code further includes instructions that perform the following: inserting, by one or more processors, a redemption header in the webpage element of the merchant webpage if the selected merchant matches the merchant associated with the merchant website. The redemption header includes the selected offer redemption identifier associated with the selected offer, the redemption header being displayed on the merchant webpage. Finally, the executable computer code further includes instructions that perform the following: providing, by one or more processors, the webpage element of the merchant webpage as an empty webpage element if the selected merchant does not match the merchant associated with the merchant website and receiving, by one or more processors, a selection of one of the plurality of offers, the selected offer being associated with a selected offer redemption identifier and a selected merchant.

Moreover, in some embodiments, a computer-implemented method is provided that includes providing a webpage element of a first merchant webpage in a first browser instance and inserting, by one or more processors, a redemption header in the webpage element of the first merchant webpage, the redemption header including an offer redemption identifier associated with a selected offer and the redemption header being displayed on the merchant webpage. The computer-implemented method also includes detecting, by one or more processors, an input field in a second merchant webpage having the redemption header and determining whether the input field is configured to receive the offer redemption identifier. Finally, the method includes populating the input field with a value corresponding to the offer redemption identifier based on the determination.

Finally, in some embodiments a computer-implemented method is provided that includes providing, by one or more processors, a webpage element of a merchant webpage in a first browser instance and inserting, by one or more processors, a redemption header in the webpage element of the merchant webpage, the redemption header including an offer redemption identifier associated with a selected offer, the redemption header being displayed on the merchant webpage. The method also includes detecting, by one or more processors, submission of the offer redemption identifier for redemption and providing, by one or more processors, a first user feedback request in the redemption header, the first user feedback request including first user feedback text, a first user feedback control, a first user feedback field, or any combination thereof. Additionally, the method includes receiving, by one or more processors, first user feedback in response to the first user feedback request and determining, by one or more processors, whether the first user feedback matches a condition. The first user feedback includes a selection of a user feedback control, an input into a user feedback field, or a combination thereof. Moreover, the method includes providing, by one or more processors, a second user feedback request in the redemption header if the first user feedback matches the condition, the second user feedback request including second user feedback text, a second user feedback control, a second user feedback field, or any combination thereof, and providing, by one or more processors, an indication in the redemption header that the first user feedback request is complete.

Figure 1:
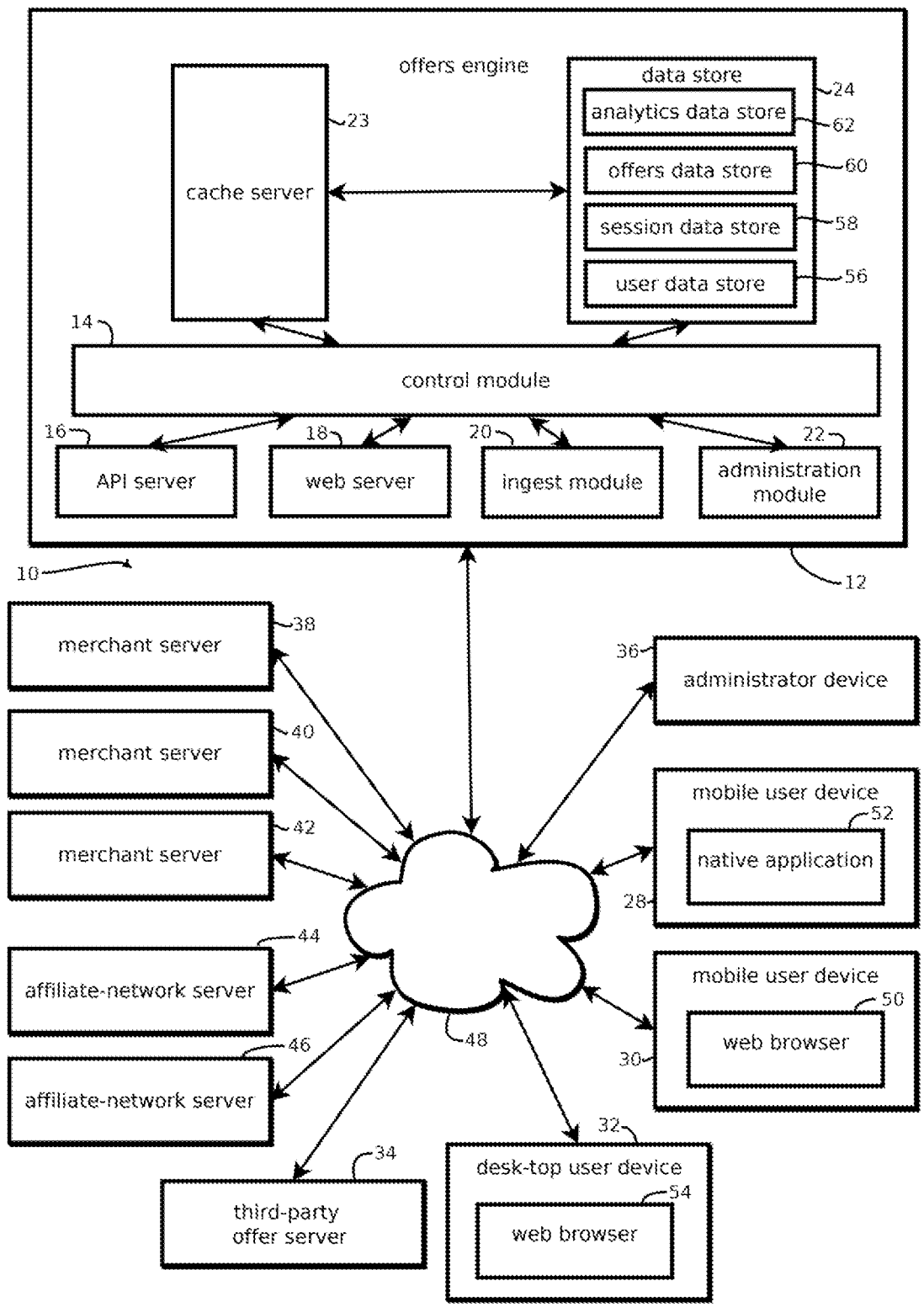
FIG. 1 is a schematic block diagram of an example of an offer-discovery system in accordance with some embodiments.

Although the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

The above-mentioned deficiencies in existing offer-discovery systems may be mitigated by certain embodiments of an offer-discovery system 10 illustrated by FIG. 1. The exemplary system 10 includes an offers engine 12 that, in some embodiments, is capable of reducing the burden on users attempting to identify offers relevant to them from among a relatively large pool of offers (e.g., more than 100, more than 1000, or more than 10,000). To this end and others, the offers engine 12 maintains device-independent user profiles (or portions of user profiles) by which offers interfaces may be consistently configured across multiple user devices with which the user interacts with the offers engine 12. Further, the offers engine 12, in this embodiment, includes a number of features expected to facilitate relatively quick identification of relevant offers by a user, features that include cached storage of data related to likely relevant offers, faceted presentation of offers by which users can select among offers within various categories, and a number of other techniques described below for identifying relevant offers. The offers engine 12 is also expected to facilitate relatively low operating costs by, in some embodiments, automating parts of the process by which offer related data is acquired from sources, such as affiliate networks merchants, administrators, or users, and parts of the process by which transaction data indicative of acceptance, settlement, or clearing of offers is obtained and processed.

These and other benefits provided by the various embodiments of the offers engine 12 are described in greater detail below after introducing the components of the system 10 and describing their operation. It should be noted, however, that not all embodiments necessarily provide all of the benefits outlined herein, and some embodiments may provide all or a subset of these benefits or different benefits.

In the illustrated embodiments, for example, the offers engine 12 includes a control module 14, an application program interface (API) server 16, a web server 18, and ingest module 20, an administration module 22, a data store 24, and a cache server 23. These components, in some embodiments, communicate with one another in order to provide the functionality of the offers engine 12 described herein. As described in greater detail below, in some embodiments, the data store 24 may store data about offers and users' interactions with those offers; the cache server 23 may expedite access to this data by storing likely relevant data in relatively high speed memory, for example in random-access memory or a solid-state drive; the Web server 20 may serve webpages having offers interfaces by which users discover relevant offers; the API server 16 may serve data to various applications that process data related to offers; the ingest module 20 may facilitate the intake of data related to offers from affiliate networks, users, administrators, and merchants; and the administration module 22 may facilitate curation of offers presented by the API server 16 and the web server 18. The operation of these components 16, 18, 20, 22, 24, and 23 may be coordinated by the control module 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications on one computing device, or by passing values to and from functions, modules, or objects within an application, e.g., by reference or by value.

Among other things, the offers engine 12 of this embodiment presents offers to users; receives data from users about their interaction with the offers (for example the user's favorite offers or offer attributes; statistics about the offers the user has identified, accepted, or otherwise provided data about; or the identity of other users with whom the user communicates about offers and the content of those communications—if users opt to have such data obtained); customizes the presentation of offers based on this received data; and facilitates the processing of compensation from merchants (either directly or through affiliate networks) as a result of users accepting (or taking a specific action like clicking or viewing, in some embodiments or use cases) offers. This interaction with users may occur via a website viewed on a desktop computer, tablet, or a laptop of the user; or a mobile website viewed on a smartphone, tablet, or other mobile user device, or native application executing on a smartphone, tablet, or other mobile user device. Presenting and facilitating interaction with offers across a variety of devices is expected to make it easier for users to identify relevant offers at the time the user is interested in those offers, which is often different from the time at which the user first discovers the offer. In particular, some embodiments allow users to store data indicative of offers relevant to that user using one device, such as a desktop computer in the user's home, and then view those offers at a later time, such as on a native mobile application when in a retail store.

To illustrate an example of the environment in which the offers engine 12 operates, the illustrated embodiment of the offer-discovery system 10 of FIG. 1 includes a number of components with which the offers engine 12 communicates: mobile user devices 28 and 30; a desktop user device 32; a third party server 34; an administrator device 36; merchant servers 38, 40, and 42; and affiliate-network servers 44 and 46. Each of these devices communicates with the offers engine 12 via a network 48, such as the Internet or the Internet in combination with various other networks, like local area networks, cellular networks, or personal area networks.

The mobile user devices 28 and 30 may be smartphones, tablets, gaming devices, or other hand-held networked computing devices having a display, a user input device (e.g., buttons, keys, voice recognition, or a single or multi-touch touchscreen), memory (e.g., a tangible machine-readable non-transitory memory), a network interface, a portable energy source (e.g., a battery), and a processor (a term which, as used herein, includes one or more processors) coupled to each of these components. The memory of the mobile user devices 28 and 30 may store instructions that when executed by the associated processor provide an operating system and various applications, including a web browser 50 or a native mobile application 52. The native application 52, in some embodiments, is operative to provide an offers interface that communicates with the offers engine 12 and facilitates user interaction with data from the offers engine 12. Similarly, the web browser 50 may be configured to receive a website from the offers engine 12 having data related to deals and instructions (for example instructions expressed in JavaScript™) that when executed by the browser (which is executed by the processor) cause the mobile user device to communicate with the offers engine 12 and facilitate user interaction with data from the offers engine 12. The native application 52 and the web browser 50, upon rendering a webpage from the offers engine 12, may generally be referred to as client applications of the offers engine 12, which in some embodiments may be referred to as a server. Embodiments, however, are not limited to client/server architectures, and the offers engine 12, as illustrated, may include a variety of components other than those functioning primarily as a server.

The desktop user device 32 may also include a web browser 54 that serves the same or similar role as the web browser 50 in the mobile user device 30. In addition, the desktop user device 32 may include a monitor, a keyboard, a mouse, memory, a processor, and a tangible, non-transitory, machine-readable memory storing instructions that when executed by the processor provide an operating system and the web browser.

Third-party offer server 34 may be configured to embed data from the offers engine 12 in websites or other services provided by the third-party offer server 34. For example, third-party offer server 34 may be a server of a social networking service upon which users post comments or statistics about offers with which the user has interacted or recommends others to interact consider or avoid. In another example, third-party offer server 34 may include various services for publishing content to the Web, such as blogs, tweets, likes, dislikes, ratings, and the like. In another example, third-party offer server 34 provides services by which third-parties curate offers hosted by the offers engine 12.

Merchant servers 38, 40, and 42 host websites or other user accessible content interfaces by which users can accept offers hosted by the offers engine 12. In some embodiments, and in some use cases, the merchant servers 38, 40, and 42 host retail websites that present a plurality of items for sale by the merchant, a subset of which may include items to which offers apply, thereby generally making the item for sale more desirable to cost-sensitive consumers than under the terms presented by the merchant in the absence of the offer. For example, the offers may include free or discounted shipping, a discounted price, a bulk discount, a rebate, a referral award, or a coupon, such as a coupon acceptable by presenting a coupon code during checkout on the merchant website, or a printable or displayable coupon (e.g., on the screen of a mobile device) for in-store use, the printable coupon having, in some cases, a machine readable code (e.g., a bar code or QR code for display and scanning, or a code passed via near-field communication or Bluetooth™). In some embodiments, the merchant website includes a checkout webpage having an interface for the user to enter payment information and a coupon code, and the merchant website (either with logic on the client side or the server-side) may validate the coupon code entered by the user and, upon determining that the coupon code is valid, adjust the terms presented to the user for acceptance in accordance with the offer.

Some merchants may limit the number of uses of a given coupon, limit the duration over which the coupon is valid, or apply other conditions to use of the coupon, each of which may add to the burden faced by users seeking to find valid coupons applicable to an item the user wishes to purchase. As noted above, some embodiments of the offers engine 12 are expected to mitigate this burden.

Further, in some embodiments, the merchant servers 38, 40, and 42 provide data about offers to the offers engine 12 or (i.e., and/or) data about transactions involving offers. In use cases in which the operator of the offers engine 12 has a direct affiliate-marketing relationship with one of the merchants of the merchant servers 38, 40, or 42, the transaction data may provide the basis for payments by the merchant directly to the operator of the offers engine 12. For example, payments may be based on a percentage of transactions to which offers were applied, a number of sales to which offers were applied, or a number of users who viewed or selected or otherwise interacted with an offer by the merchant.

Affiliate-network servers 44 and 46, in some embodiments and some use cases, are engaged when the entity operating the offers engine 12 does not have a direct affiliate-marketing relationship with the merchant making a given offer. In many affiliate marketing programs, merchants compensate outside entities, such as third-party publishers, for certain activities related to sales by that merchant and spurred by the outside entity. For example, in some affiliate marketing programs, merchants compensate an affiliate, such as the entity operating the offers engine 12, in cases in which it can be shown that the affiliate provided a given coupon code to a given user who then use that coupon code in a transaction with the merchant. Demonstrating this connection to the merchant is one of the functions of the affiliate-networks.

Affiliate-networks are used, in some use cases, because many coupon codes are not affiliate specific and are shared across multiple affiliates, as the merchant often desires the widest distribution of a relatively easily remembered coupon code. Accordingly, in some use cases, the merchant, affiliate network, and affiliate cooperate to use client-side storage to indicate the identity of the affiliate that provided a given coupon code to a user. To this end, in some embodiments, when a webpage offers interface is presented by the offers engine 12 in the web browsers 50 or 54, that webpage is configured by the offers engine 12 to include instructions to engage the affiliate network server 44 or 46 when a user selects an offer, for example by clicking on, touching, or otherwise registering a selection of an offer. The website provided by the offers engine 12 responds to such a selection by, in some embodiments, transmitting a request to the appropriate affiliate-network server 44 or 46 (as identified by, for example, an associated uniform resource locator (URL) in the webpage) for a webpage or portion of a webpage (e.g., browser-executable content). The request to the affiliate-network server may include (e.g., as parameters of the URL) an identifier of the affiliate, the offer, and the merchant, and the returned content from the affiliate-network server may include instructions for the web browser 50 or 54 to store in memory (e.g., in a cookie, or other form of browser-accessible storage item, such as an entry in a SQLite database or in a local Storage object via a localStorage.setItem command) an identifier of the affiliate that provided the offer that was selected.

The webpage from the offers engine 12 (or the content returned by the affiliate network server 44 or 46) further may include browser instructions to navigate to the website served by the merchant server 38, 40, or 42 of the merchant associated with the offer selected by the user, and in some cases to the webpage of the item or service associated with the offer selected by the user. When a user applies the offer, for example by purchasing the item or service or purchasing the item or service with the coupon code, the merchant server 38, 40, or 42 may transmit to the user device upon which the item was purchased instructions to request content from the affiliate network server 44 or 46, and this requested content may retrieve from the client-side memory the identifier of the affiliate, such as the operator of the offers engine 12, who provided the information about the offer to the user. The affiliate network may then report to the merchant the identity of the affiliate that should be credited with the transaction, and the merchant may compensate the affiliate, or the affiliate network may bill the merchant, and the affiliate network may compensate the affiliate, such as the operator of the offers engine 12. Thus, the affiliate network acts as an intermediary, potentially avoiding the need for cross-domain access to browser memory on the user device, a feature which is generally not supported by web browsers for security reasons. (Some embodiments may, however, store in client-side browser-accessible memory an identifier of the affiliate upon user selection of the offer, with this value designated as being accessible via the merchant's domain, and provide the value to the merchant upon a merchant request following acceptance of the offer, without passing the identifier through an affiliate network, using a browser plug-in for providing cross-domain access to browser memory or a browser otherwise configured to provide such access.)

A similar mechanism may be used by the native application 52 for obtaining compensation from merchants. In some embodiments, the native application 52 includes or is capable of instantiating a web browser, like the web browser 50, in response to a user selecting an offer presented by the native application 52. The web browser instantiated by the native application 52 may be initialized by submitting the above-mentioned request for content to the affiliate-network server 44 or 46, thereby storing an identifier of the affiliate (i.e., the entity operating the offers engine 12) in a client-side storage item (e.g. a cookie, localStorage object, or a database) of the mobile user device 28 and navigating that browser to the merchant website. In other use cases, the operator of the offers engine 12 has a direct relationship with the merchant issuing the offer, and the selection of an offer within the native application 52 or the desktop or mobile website of the offers engine 12 (generally referred to herein as examples of an offer interface) may cause the user device to request a website from the associated merchant with an identifier of the affiliate included in the request, for example as a parameter of a URL transmitted in a GET request to the merchant server 38, 40, or 42 for the merchant's website.

Administrator device 36 may be a special-purpose application or a web-based application operable to administer operation of the offers engine 12, e.g., for use by employees or agents of the entity operating the offers engine 12. In some embodiments, the administration module 22 may communicate with the administrator device 36 to present an administration interface at the administrator device 36 by which an administrator may configure offers interfaces presented to users by the offers engine 12. In some embodiments, the administrator may enter offers into the offers engine 12, delete offers from the offers engine 12, identify offers for prominent placement within the offers interface (e.g. for initial presentation prior to user interaction), moderate comments on offers, view statistics on offers, merchants, or users, add content to enhance the presentation of offers, or categorize offers.

Thus, the offers engine 12, in some embodiments, operates in the illustrated environment by communicating with a number of different devices and transmitting instructions to various devices to communicate with one another. The number of illustrated merchant servers, affiliate network servers, third-party servers, user devices, and administrator devices is selected for explanatory purposes only, and embodiments are not limited to the specific number of any such devices illustrated by FIG. 1.

The offers engine 12 of some embodiments includes a number of components introduced above that facilitate the discovery of offers by users. For example, the illustrated API server 16 may be configured to communicate data about offers via an offers protocol, such as a representational-state transfer (REST)-based API protocol over hypertext transfer protocol (HTTP). Examples of services that may be exposed by the API server 18 include requests to modify, add, or retrieve portions or all of user profiles, offers, or comments about offers. API requests may identify which data is to be modified, added, or retrieved by specifying criteria for identifying records, such as queries for retrieving or processing information about particular categories of offers, offers from particular stores, or data about particular users. In some embodiments, the API server 16 communicates with the native application 52 of the mobile user device 28 or the third-party offer server 34. In some embodiments, the offers engine 12 may include a content delivery network (CDN) for delivering static content to user devices. Additionally, or alternatively, in some embodiments the CDN may include a cookieless domain to aid in the faster delivery of static content.

The illustrated web server 18 may be configured to receive requests for offers interfaces encoded in a webpage (e.g. a collection of resources to be rendered by the browser and associated plug-ins, including execution of scripts, such as JavaScript™, invoked by the webpage). In some embodiments, the offers interface may include inputs by which the user may request additional data, such as clickable or touchable display regions or are display regions for text input. Such inputs may prompt the browser to request additional data from the web server 18 or transmit data to the web server 18, and a web server 18 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g., JavaScript™ object notation (JSON) or extensible markup language (XML). The web server 18 may communicate with web browsers, such as the web browser 50 or 54 executed by user devices 30 or 32. In some embodiments, the webpage is modified by the web server 18 based on the type of user device, e.g., with a mobile webpage having fewer and smaller images and a narrower width being presented to the mobile user device 30, and a larger, more content rich webpage being presented to the desktop user device 32. An identifier of the type of user device, either mobile or non-mobile, for example, may be encoded in the request for the webpage by the web browser (e.g., as a user agent type in an HTTP header associated with a GET request), and the web server 18 may select the appropriate offers interface based on this embedded identifier, thereby providing an offers interface appropriately configured for the specific user device in use.

The illustrated ingest module 20 may be configured to receive data about new offers (e.g., offers that are potentially not presently stored in the data store 24), such as data feeds from the affiliate network servers 44 and 46, identifications of offers from user devices 28, 30, or 32, offers identified by third-party offer server 34, offers identified by merchant servers 38, 40, or 42, or offers entered by an administrator via the administrator device 36. In some embodiments, the ingest module 20 may respond to receipt of a record identifying a potentially new offer by querying the data store 24 to determine whether the offer is presently stored. Upon determining that the offer is not presently stored by the data store 24, the ingest module 20 may transmit a request to the data store 24 to store the record. In some cases, the data about new offers may be an affiliate datafeed from an affiliate network containing a plurality of offer records (e.g., more than 100), each record identifying offer terms, and a merchant, a URL of the merchant associated with the offer, a product description, and an offer identifier. The ingest module 22 may periodically query such data feeds from the affiliate-network servers 44 or 46, parse the data feeds, and iterate through (or map each entry to one of a plurality of processes operating in parallel) the records in the data feeds. Bulk, automated processing of such data feeds may lower operating costs of the offers engine 12.

The administration module 22 may provide an interface by which an administrator operating the administrator device 36 curates and contextualizes offers. For example, the administration module 22 may receive instructions from the administrator that identify offers to be presented in the offer interface prior to user interaction with the offer interface, or offers to be presented in this initialized offers interface for certain categories of users, such as users having certain attributes within their user profile. Further, in some embodiments, the administration module 22 may receive data descriptive of offers from the administrator, such as URLs of images relevant to the offer, categorizations of the offer, normalized data about the offer, and the like.

The illustrated data store 24, in some embodiments, stores data about offers and user interactions with those offers. The data store 24 may include various types of data stores, including relational or nonrelational databases, document collections, hierarchical key value pairs, or memory images, for example. In this embodiment, the data store 24 includes a user data store 56, a session data store 58, an offers data store 60, and an analytics data store 62. These data stores 56, 58, 60, and 62 may be stored in a single database, document, or the like, or may be stored in separate data structures.

In this embodiment, the illustrated user data store 56 includes a plurality of records, each record being a user profile and having a user identifier, a list of offers (e.g. identifiers of offers) identified by the user as favorites, a list of categories of offers identified by the user as being favorites, a list of merchants identified by the user as being favorites, account information for interfacing with other services to which the user subscribes (e.g. a plurality of access records, each record including an identifier of a service, a URL of the service, a user identifier for the service, an OAuth access token credential issued by the service at the user's request, and an expiration time of the credential), a user password for the offers engine 12, a location of the user device or the user (e.g., a zip code of a user), and a gender of the user. In some embodiments, each user profile includes a list of other users identified by the user of the user profile as being people in whose commentary on or curation of offers the user is interested, thereby forming an offers-interest graph. In some embodiments, users have control of their data, including what is stored and who can view the data, and can choose to opt-in to the collection and storage of such user data to improve their experience with the offers engine 12.

In this embodiment, the session data store 58 stores a plurality of session records, each record including information about a session a given user is having or has had with the offers engine 12. The session records may specify a session identifier, a user identifier, and state data about the session, including which requests have been received from the user, and what data has been transmitted to the user. Session records may also indicate the IP address of the user device, timestamps of exchanges with the user device, and a location of the user device (e.g., retail store or aisle in a retail store in which the user device is located).

The illustrated offers data store 60 in some embodiments includes a plurality of offer records, each offer record may identify a merchant, offers by that merchant, and attributes of the relationship with the merchant, e.g., whether there is a direct relationship with the merchant by which the merchant directly compensates the operator of the offers engine 12 or whether the merchant compensates the operator of the offers engine 12 via an affiliate network, and which affiliate network. The offers by each merchant may be stored in a plurality of merchant-offer records, each merchant-offer record may specify applicable terms and conditions of the offer, e.g., whether the offer is a discount, includes free or discounted shipping, requires purchase of a certain number of items, is a rebate, or is a coupon (which is not to suggest that these designations are mutually exclusive). In records in which the offer is a coupon, the record may further indicate whether the coupon is for in-store use (e.g. whether the coupon is associated with a printable image for presentation at a point-of-sale terminal, a mobile device-displayable image, or other mediums) or whether the coupon is for online use and has a coupon code, in which case the coupon code is also part of the merchant-offer record. The merchant-offer records may also include an expiration date of the offer, comments on the offer, rankings of the offer by users, a time at which the offer was first issued or entered into the offers engine 12, and values (e.g., binary values) indicating whether users found the offer to be effective, with each value or ranking being associated with a timestamp, in some embodiments. The values and rankings may be used to calculate statistics indicative of the desirability of the offer and likely success of accepting the offer. The timestamps associated with the values, rankings, and time of issuance or entry into the offers engine 12 may also be used to weight rankings of the offer, with older values being assigned less weight than newer values and older offers being ranked lower than newer offers, all other things being equal, as many offers expire or have a limited number of uses.

The illustrated analytics data store 62 may store a plurality of records about historical interactions with the offers engine 12, such as aggregate statistics about the performance of various offers. In some embodiments, the analytics data store 62 stores a plurality of transaction records, each transaction record identifying, one or more of, for example, an offer that was accepted by a user at a merchant, the merchant, the time of presentation of the offer to the user, and an indicator of whether the merchant has compensated the entity operating the offers engine 12 for presentation of the offer to the user. Storing and auditing these transaction records may facilitate relatively accurate collection of payments owed by merchants and identification of future offers likely to lead to relatively high rates of compensation for prominent presentation based on past performance of offers having similar attributes.

The cache server 23 stores a subset of the data in the data store 24 that is among the more likely data to be accessed in the near future. To facilitate relatively fast access, the cache server 23 may store cached data in relatively high speed memory, such as random access memory or a solid-state drive. The cached data may include offers entered into the offers engine 12 within a threshold period of time, such as offers that are newer than one day. In another example, the cache data may include offers that are accessed with greater than a threshold frequency, such as offers that are accessed more than once a day, or offers accessed within the threshold, such as offers accessed within the previous day. Caching such offer data may facilitate faster access to offer data than systems that do not cache offer data.

The illustrated control module 14, in some embodiments, controls the operation of the other components of the offers engine 12, receiving requests for data or requests to add or modify data from the API server 16, the web server 18, the ingest module 20, and the administration module 22, and instructing the data store 24 to modify, retrieve, or add data in accordance with the request. The control module 14 may further instruct the cache server 23 to modify data mirrored in the cache server 23. In some embodiments, the cache server 23 may be updated hourly, and inconsistent data may potentially be maintained in the cache server 23 in order to conserve computing resources.

The illustrated components of the offers engine 12 are depicted as discrete functional blocks, but embodiments are not limited to systems in which the functionality described herein is organized as illustrated by FIG. 1. The functionality provided by each of the components of the offers engine 12 may be provided by software or hardware modules that are differently organized than is presently depicted, for example such software or hardware may be intermingled, broken up, distributed (e.g. within a data center or geographically), or otherwise differently organized.

Figure 2:
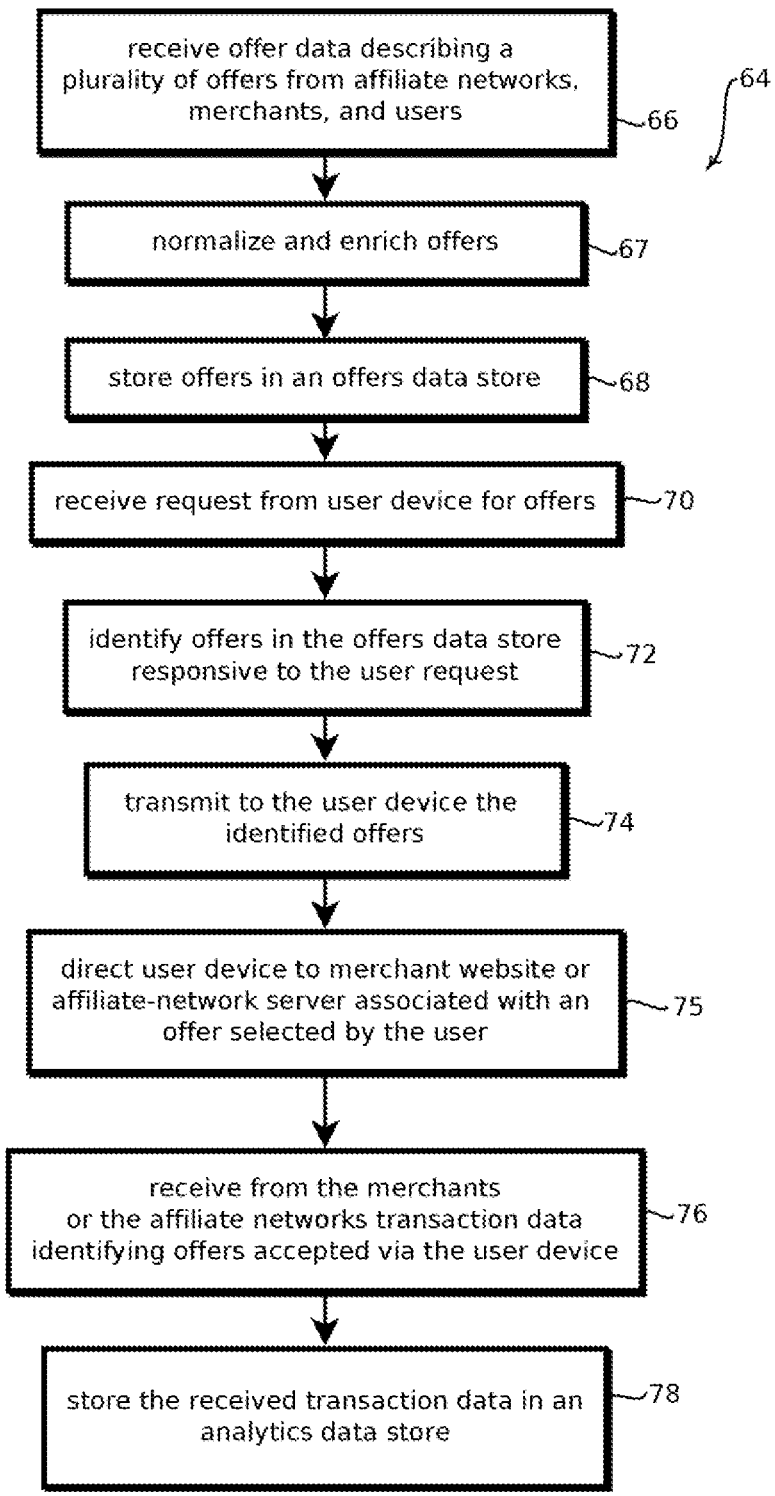
FIG. 2 is a block diagram of an example of a process by which an offers engine in the offer-discovery system of FIG. 1, in some embodiments, obtains and processes data related to offers.

FIG. 2 is a flowchart of a process 64 for acquiring data related to offers within some embodiments of the offer engine 12 discussed above. In this embodiment, the process 64 begins with receiving offer data describing a plurality of offers from affiliate networks, merchants, and users, as illustrated by block 66. This step may be performed by the above-mentioned ingest module 20. As noted above, the received offer data may be received from one or all of these sources. The received offer data may be received via an offer interface by which users associated with these sources enter data about offers, or the received offer data may be received in a predefined format, such as a serialized data format, in an automatic data feed pushed or pulled periodically or in response to the availability of new data from affiliate networks or merchants. Receiving the offer data may include determining whether the offer data is redundant to offer data already received and normalizing the offer data.

The process 64, in some embodiments, includes normalizing and enriching the offer data, as illustrated by block 67. Normalizing may include normalizing field names of the data and normalizing the way in which dates are expressed, for example. Enriching may include associating images with the offers for presentation with the offers and adding metadata to the offers to assist users searching for offers.

Next, in the present embodiment, the received offer data is stored in an offers data store, as indicated by block 68. Storing the offer data in the offers data store may include identifying a merchant to which the offer pertains and storing the offer in a merchant-offer record associated with that merchant. Further, some embodiments may include inserting the offer in order in a sorted list of offers for relatively fast retrieval of offers using a binary search algorithm or other techniques to facilitate relatively quick access to data that has been preprocessed (e.g., using a prefix trie). In some embodiments, storing the received offer may further include updating hash tables by which the offer may be retrieved according to various parameters, each hash table being associated with one parameter and including a hash key value calculated based on the parameter and paired with an address of the offer. Such hash tables are expected to facilitate relatively fast access to a given offer as the need to iterate through potentially all offers meeting certain criteria may be potentially avoided.

In some embodiments, the process 64 further includes receiving a request from a user device for offers, as indicated by block 70. The request may specify criteria for identifying offers, such as categories of offers, search terms for offers, or requests for offers designated as favorites.

Next, the present embodiment includes identifying offers in the offers data store responsive to the user request, as indicated by block 72. Identifying offers in the offers data store may be performed by the above-mentioned control module 14 (FIG. 1) by constructing a query to the offers data store 60 based on a request received from the web server 18 or the API server 16. The query may be transmitted to the offers data store 60, or to the cache server 23, each of which may return responsive records.

Next, the identified offers are transmitted to the user device, as indicated by block 74. Transmitting the identified offers may include transmitting the identified offers in an offer interface, such as a webpage, or an API transmission to a native mobile application, for example by the web server 18, or the API server 16 of FIG. 1, respectively.

The device receiving the identified offers may, in response, perform a process described below with reference to FIG. 3 by which additional offers are requested or an offer is selected and a purchase is executed. The process of FIG. 3 and steps 70 through 74 of FIG. 2 may be repeated numerous times, in some use cases, before advancing to the next steps. Further, the steps 66 through 68 may be repeated numerous times independently of (e.g., concurrent with) the performance of steps 70 through 74 of FIG. 2 (which is not to suggest that other steps described herein may not also be executed independently). That is, the process 64 may undergo step 66 and 68, for example 50 times within a given time, while performing steps 70 through 74 500 times within that given time, and performing the remaining steps of process 64 a single time.

Figure 3:
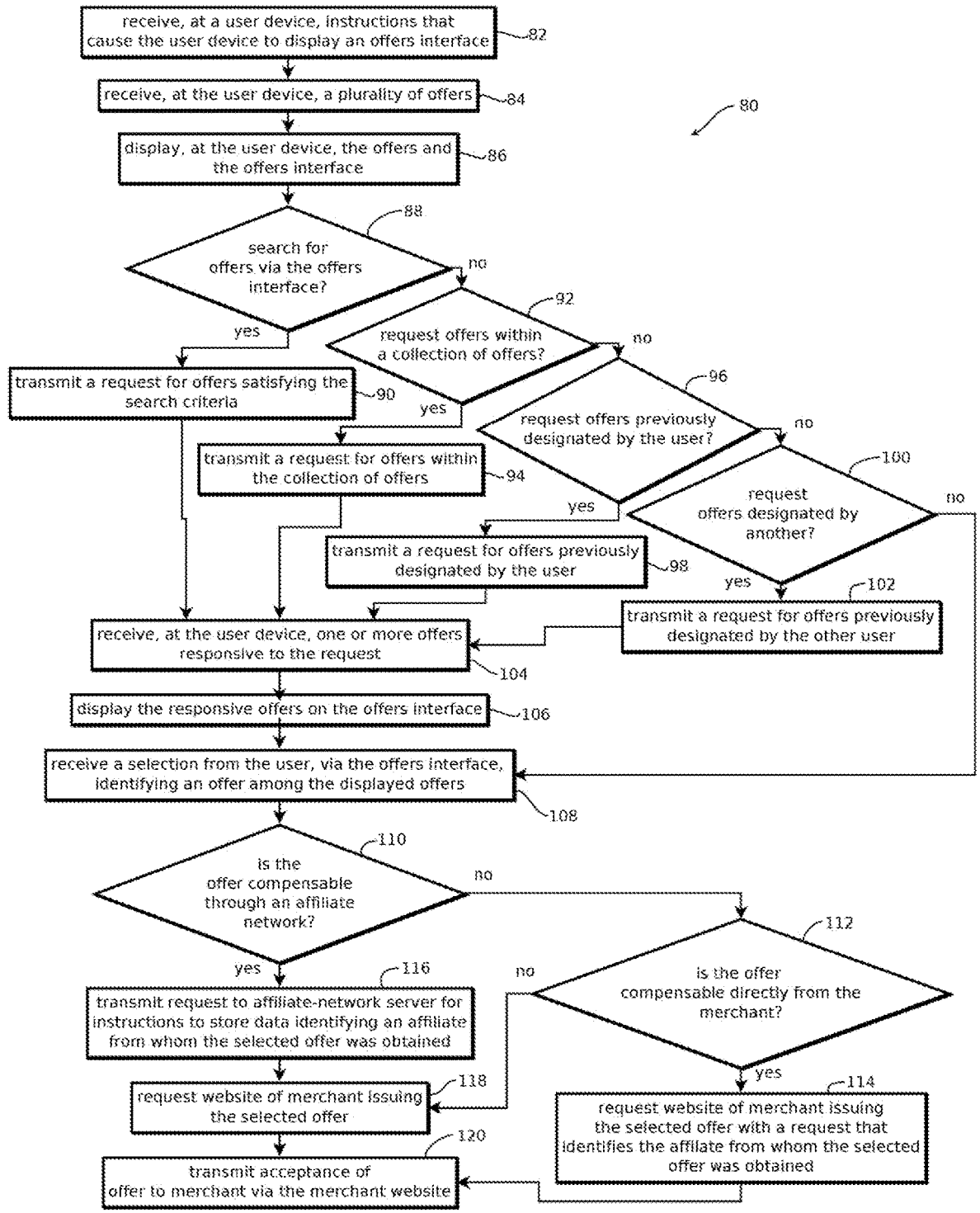
FIG. 3 is a block diagram of an example of a process by which a user device in the offer-discovery system of FIG. 1, in some embodiments, obtains and presents to users data related to offers.

In some embodiments, a user device undergoing the process of FIG. 3 may indicate to an offers engine 12 that the user has selected an offer (e.g., by clicking on or touching a selectable element in an offers interface associated with the offer) to the offers engine 12. In response, the offers engine may direct the user device to an affiliate-network server or a merchant server associated with the offer, as illustrated by block 75.

Next, this embodiment of the process 64 includes receiving from merchants or affiliate networks transaction data identifying offers accepted via the user device, as illustrated by block 76. The transaction data may be pulled from these sources, for example by the ingest module 20 of FIG. 1, periodically, or in response to some threshold number of transactions having occurred.

Next, in this embodiment, the receipt transaction data may be stored in an analytics data store, as indicated by block 78. In some embodiments, this data may be stored in the analytics data store 62 of FIG. 1. Storing the transaction data may facilitate the identification of attributes of relatively profitable offers, as the transaction data indicates which offers historically yielded compensable transactions. Further, storing the transaction data may facilitate relatively accurate auditing of payments from merchants or affiliate networks.

FIG. 3 is a flowchart of an embodiment of a process 80 that provides an example of an offer interface at a user device. The process 80 may be performed by the above-mentioned native application 52 or web browser 50 or 54 in cooperation with the offers engine 12.

Some embodiments of process 80 begin with receiving, at a user device, instructions that cause the user device to display an offers interface, as indicated by block 82. The received instructions may be in the form of a downloaded native application, such as one downloaded from an application store hosted by a provider of mobile devices, or the received instructions may be in the form of a website received from the offers engine 12 and rendered in a browser of the user device.

In some embodiments, the process 80 further includes receiving, at the user device, a plurality of offers, as indicated by block 84, and displaying, at the user device, the offers in the offer interface, as indicated by block 86. The offers may be received at approximately the same time the instructions of step 82 are received, for example along with a webpage, or the offers may be received at a later date, for example during a session subsequent to downloading the native application.

The offers interface may include inputs by which the user may search, filter, or otherwise browse offers having various attributes. Some of these interfaces are described below with reference to steps performed to determine whether the user has engaged these inputs. In some embodiments, determining whether the user has engaged these inputs may be performed by an event handler executed by the user device, the event handler causing the user device to perform the corresponding, below-described requests to the offers engine 12 based on the type of event, e.g. whether the user touched, clicked, or otherwise selected a particular button on the offers interface.

Illustrated process 80 includes determining whether the user is searching for offers, as indicated by block 88. With the offers interface, the user may express an intent to search for offers by entering search terms in a text entry box and selecting a button to request a search in accordance with the entered search term. Upon selecting this button, the user device may transmit a request for offers satisfying the entered search criteria, as indicated by block 90. The transmitted request may be in the form of a GET request or an API call to the web server 18 or the API server 16 of the offers engine 12 of FIG. 1.

In some embodiments, the process 80 further includes determining whether the user requests offers within a collection of offers, as indicated by block 92. The offers interface may include selectable inputs that identify the collections, such as clickable collection names, collection selection buttons, or collection selection tabs. Examples of collections include categories of goods or services, such as sporting goods, house-wares, groceries, and the like; collections of modes of coupon redemption, such as in-store coupon redemption and online coupon redemption; collections based on offer statistics, such as newest offers, most popular offers, highest ranked offers; collections of offers designated by a user or other users; or collections based the value conferred by the offer, such as discounts, free shipping, rebates, and referral fees. Upon determining that the user has requested offers within a collection, the user device may transmit a request for offers within the collection to the offers engine 12, as indicated by block 94, which may return data responsive to the request.

In some embodiments, the process 80 includes determining whether the user requests offers previously designated by the user, as indicated by block 96. In some embodiments, the offers interface may include an input by which a user can designate an offer, such as designating offers as being a user favorite, designating offers as being ranked in a particular fashion, or designating offers as likely being of interest to some other user, such as users adjacent one another in a social graph. The offers interface may include an input for a user to make designations, such as a user selectable input labeled "add to my favorites," or "add to my wallet," and an input for a user to request offers having a designation, such as a user selectable input labeled "view my favorites." or "view my wallet." Upon determining that the user made such a request, the process 80 includes transmitting a request for the offers previously designated by the user, as indicated by block 98. The transmission may be made to the offers engine 12, to the API server 16 or the web server 18, as described above with reference to FIG. 1, and may include an identification of the designation and the user.

The process 80, in some embodiments, further includes determining whether the user requests offers previously designated by another user, as indicated by block 100. The offers interface, in some embodiments, may include an input by which a user make such a request, such as a user selectable input labeled "offers recommended by my friends." Upon determining that the user has made such a request, the process 80 transmits a request for offers previously designated by the other user (or users), as indicated by block 102. Again, the transmission may be to the offers engine 12 of FIG. 1, which may store or otherwise have access to offers designated by other users and a social graph of the user by which the transmitted offers were identified. Further, the offers interface may include an input by which the user may view identifiers of other users and add the other users to an offer-interest graph of the user. This offer interest graph may be referenced by the offers engine 12 to identify offers in response to the request of step 102.

The process 80 further includes, in some embodiments, receiving, at the user device, one or more offers responsive to the request, as indicated by block 104, and displaying the responsive offers on the offers interface, as indicated by block 106.

In some embodiments and some use cases, a selection from the user is received via the offers interface, thereby identifying an offer among the displayed offers, as indicated by block 108. In some embodiments, each of the offers may be displayed with an associated input by which the user selects the offer, such as a touchable or clickable button, region, or text. The selection, in some embodiments, may cause the offers interface to request additional data from the offers engine, such as instructions from the offers engine to navigate to an affiliate-network server associated with the offer or to navigate to a merchant server associated with the offer. In other embodiments, such instructions may be present within the offers interface, e.g., in the form of URLs linking to these servers.

The process 80 further includes determining whether the selected offer is compensable through an affiliate network, as indicated by block 110. This determination may be made by the offers engine 12, in some embodiments, for each of the offers being displayed prior to transmission of the offers to the user device. For example, each offer may be associated with a designation indicating whether the offer is compensable in this fashion, and the designation may be transmitted along with the offer, for instance, by associating the offer with HTML or JavaScript™ that so designate the offer, or by including a field including the designation in a response to an API call for each offer. The user device, in some embodiments, may take different actions depending on the designation associated with the selected offer.

Upon determining that the selected offer is not compensable through an affiliate network, the process 80 of this embodiment includes determining whether the selected offer is compensable directly from the merchant associated with the offer, as indicated by block 112. Again, the determination of block 112 may be performed, in some embodiments, by the offers engine 12 for each of the offers being displayed prior to transmission of the displayed offers, and each displayed offer may be associated with a designation based on the results of the determination, such as different HTML or JavaScript™ or a different field value in an API response. The user device may take different actions depending on this designation.

Upon determining that the selected offer is not compensable directly from the merchant, the process 80 may proceed to block 118 described below. Upon determining that the selected offer is compensable, the process 80, in this embodiment, may proceed to request the website of the merchant issuing the selected offer with a request that identifies the affiliate from whom the selected offer was obtained, as indicated by block 114. The request may be in the form of a URL having as a parameter an identifier of the entity operating the offer engine 12, thereby indicating to the merchant that the affiliate should be compensated in accordance with an arrangement between the merchant and the affiliate. Upon performance of step 114, the process 80 of the present embodiment proceeds to step 120 described below.

As indicated by block 110, upon determining that the selected offer is compensable through an affiliate network, the process 80 proceeds to transmit a request to the affiliate-network server for instructions to store data identifying an affiliate from whom the selected offer was obtained, as indicated by block 116. This request may be a request for content from the affiliate-network server that is not displayed to the user, or is not displayed to the user for an appreciable amount of time (e.g., less than 500 ms), and the request may include an identifier of the affiliate, the merchant, and the offer. The requested content may cause the user device to store in persistent memory of the browser of the user device (e.g., memory that lasts between sessions, such as a cookie or a database of the browser) an identifier of the affiliate operating the offers engine 12. This value may be retrieved later by the affiliate-network at the instruction of the merchant upon the user accepting the offer, for example by the user using a coupon code associated with the offer at the merchant, thereby allowing the merchant (or the affiliate network) to identify the appropriate party to compensate for the sale.

Upon transmitting the request the affiliate network server, the process 80 further includes requesting the website of the merchant issuing the selected offer, as indicated by block 118, and transmitting acceptance of the offer to the merchant via the merchant's website, as indicated by block 120. Accepting the offer, as noted above, may cause the merchant to compensate the affiliate operating the offers engine 12.

The process 80 of FIG. 3 is expected to facilitate relatively fast access to offers that are likely to be relevant to a user, as each of the determinations of step 88, 92, 96, and 100 provide different paths by which the user can specify offers in which the user is likely to be interested. Further, the determinations of step 110 and 112 provide dual mechanisms by which the operator of the offers engine 12 can be compensated, thereby potentially increasing revenue.

In some embodiments, as described further below, a website from the offers engine 12 (referred to as an offers website) that provides offers to users may include functionality to enable users to redeem certain types of offers, e.g., online coupons. In such embodiments, the offers engine 12 may provide a customizable redemption header (also referred to as a "traveling header") in a merchant website for easier and faster redemption of online coupons and elimination or reduction of complicated user actions needed to redeem the online coupons. Accordingly, the redemption header may result in improved coupon redemption and increased sales for merchants offering online coupons provided by the offers engine. The redemption header may be provided in merchant websites provided from merchant servers 38 to enable a user to easily view offer information after leaving the offers website, as described further in U.S. Patent Application Ser. No. 61/665,740 entitled "Devices, Methods, and Computer-readable Media for Redemption Header for Merchant Offers," which is hereby incorporated by reference in its entirety for all purposes.

The redemption header may be provided on a first browser instance in response to a user interaction with a second browser instance. For example, as described below, a user may open a merchant web site in a first browser instance and may subsequently open an offers web site in a second browser instance. Upon selection of an offer on the offers website, the redemption header may be provided on the merchant website in the first browser instance. Additionally, after redemption of the offer as aided by the redemption header, the redemption header may detect redemption and display user feedback mechanisms and redemption information to a user.

Accordingly, FIGS. 4A-4I depict screens of multiple browser instances executing on a user device, such as mobile user device 28, desktop user device 32, and other devices, illustrating the redemption of an offer, e.g., an online coupon, and a customizable redemption header in accordance with an embodiment of the present invention. Although the redemption header described below is illustrated and referred to as "header," it should be appreciated that other embodiments may include a redemption bar having similar functionality provided at any location of a merchant webpage (e.g., a redemption footer). Thus, other embodiments having a redemption bar similar to the redemption header but in a different location may be provided in the manner described below.

Figure 4A:
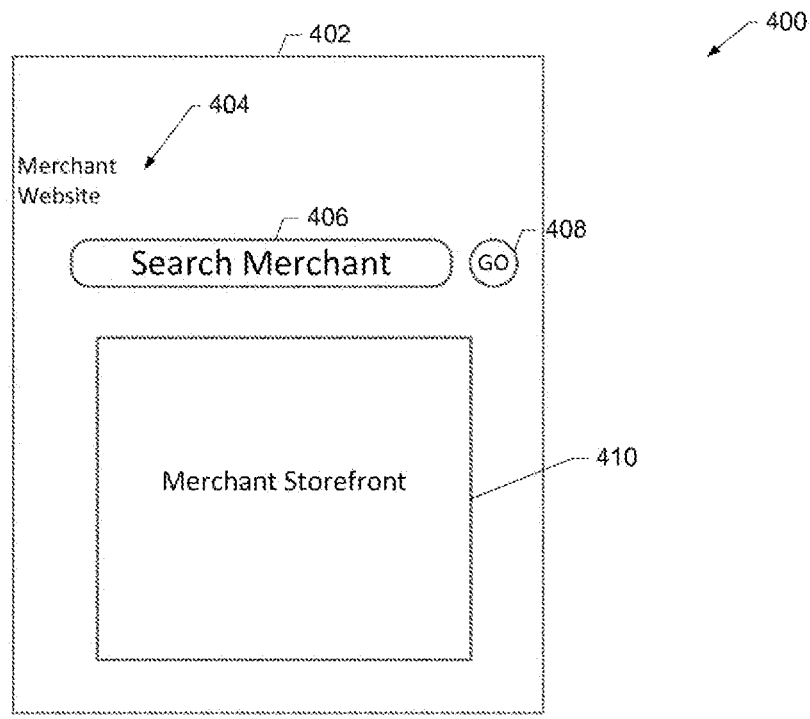
FIGS. 4A-4I are schematic diagrams illustrating screens of a user device executing browser instances in accordance with an embodiment of the present invention.

FIG. 4A depicts a screen 400 of an instance of a web browser, e.g., an application for receiving and viewing web content, in accordance with an embodiment of the present invention. As used herein, the term "browser instance" may refer to a window of a web browser, a tab of a web browser, or other instances of a browser capable of displaying a webpage. As will be appreciated, the screen 400 and other screens described below may be presented in a display of a user device that may receive inputs from a user and provide outputs on the display. In some embodiments, inputs may be received from a keyboard, a pointing device (e.g., a mouse) or other input device. In some embodiments, a user interface may include a touchscreen, software modules, or any combination thereof, and inputs may be received as touches on the touchscreen, such as from a digit of a user, a stylus, etc.

The screen 400 displays a merchant webpage 402 of a merchant web site 404, such as a website of a retailer for goods, services, or both. As described in detail below, a redemption header may be added to the merchant website 404 to display an offer redemption identifier associated with an offer and text (e.g., instructions) associated with redemption of an offer. Additionally, the redemption header may be provided in response to a user selection of an offer in a different browser instance and may be retrieved asynchronously relative to loading of the merchant webpage 404 and other webpages of the merchant website.

As described below, the webpages of the merchant website 404, such as webpage 402, may include an empty webpage element, such as in a Document Object Model associated with the merchant webpage. For example, in some embodiments an inline frame may be created via the HTML <iframe> tag. The webpages of the merchant web site may include code for providing the redemption header within the empty webpage element in response to a modification in a browser-accessible storage item, as described below. In some embodiments, the redemption header code may include JavaScript and may be inserted within an HTML <script> tag. For example, in some embodiments the merchant webpage may retrieve code for the empty webpage element and the redemption header from the offers engine 12. In such embodiments, the code may be inserted asynchronously via JavaScript™ provided in the webpages of the merchant website 404.

The merchant website 404 may include a variety of web content that enables a user to search or browse for goods, services, or both and select and order such goods and services. As shown in FIG. 4A, for example, web content of the merchant web site 404 may include a search field 406, search button 408, and a merchant storefront 410. It should be appreciated that the web content depicted in FIG. 4A is merely an example and merchant websites may include a wide variety of web content, designs, and functionality. Such functionality may include, for example, the ability to search the merchant website 404 by entering a search query into the search field 406 and selecting (e.g., touching, clicking, etc.) the search button 408. Additionally, the merchant storefront 410 may display goods, services, or both offered by the merchant and available for order by a user. In some embodiments, a user may use the search field 406 to find the goods, services, or both associated with a selected offer.

A user may concurrently open another browser instance after retrieving and viewing the merchant webpage 402. Upon viewing the merchant webpage 402, for example, a user may open another browser instance to search for offers, such as coupons, applicable to goods services, or both purchased from the merchant. In some instances, a user may not have an offer readily available and may attempt to find an offer to provide a further incentive to complete a purchase from the merchant. The ready availability of such offers and the ease of redemption of such offers on the merchant web site, as facilitated by the providing of the redemption header in the manner described herein, may increase merchant sales and aid in encouraging a user to complete a purchase.

Figure 4B:
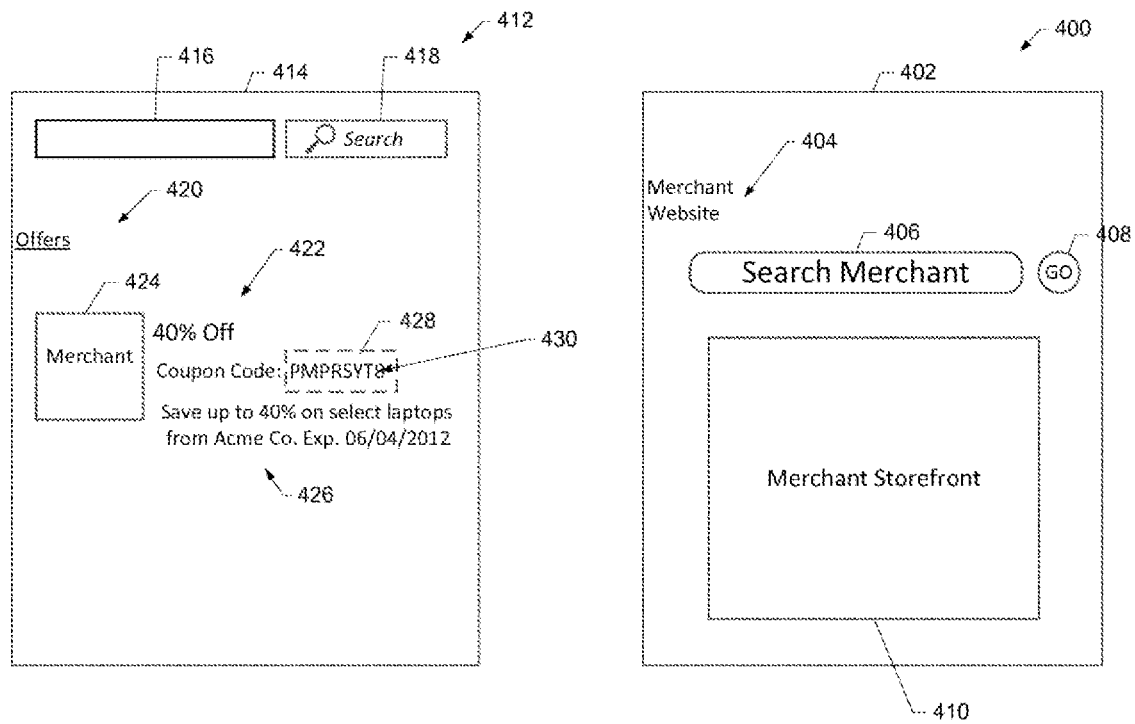
Figure 4C:
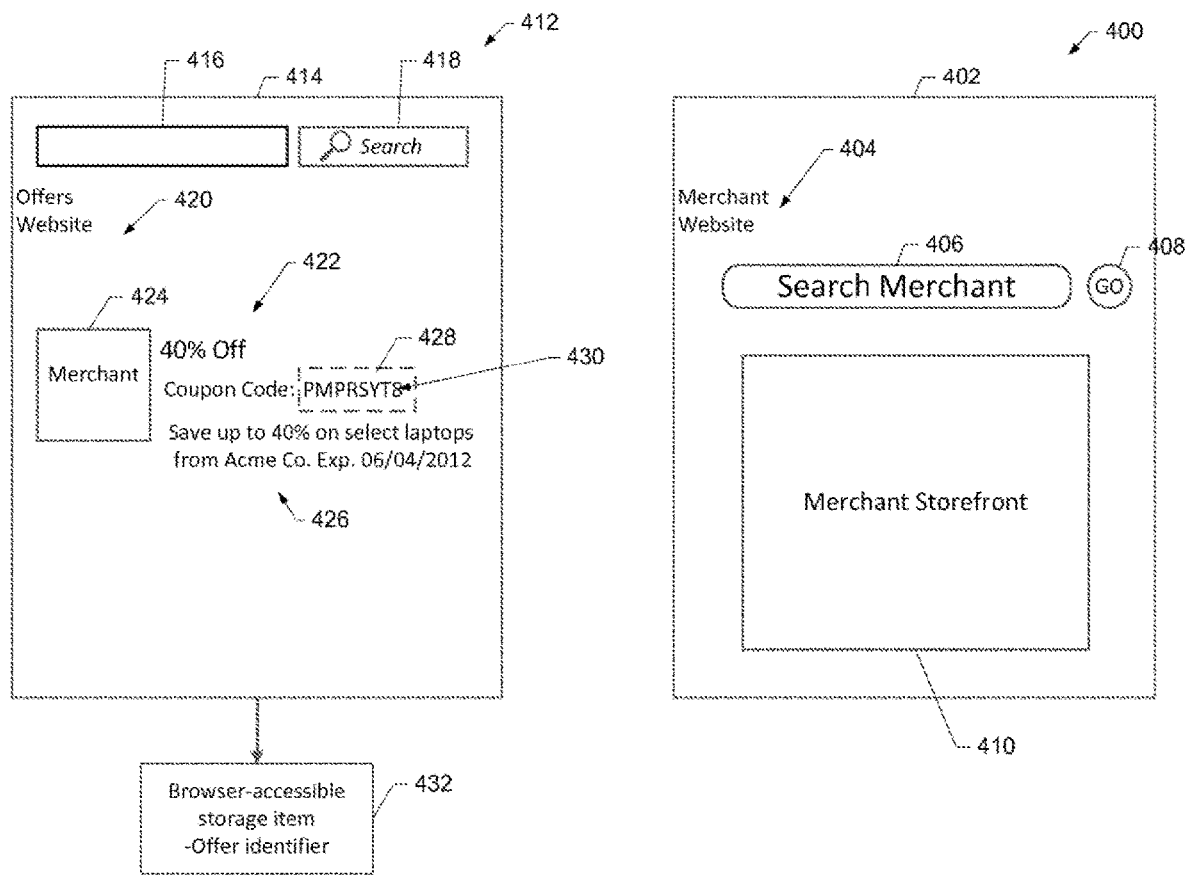

With the foregoing in mind, FIG. 4B depicts a screen 412 of another web browser instance (e.g., a new tab, a new window, etc.) and the screen 402 of the first web browser instance described above. As noted above, a user may have both web browser instances executing concurrently on a user device. A user may thus switch between each instance of the web browser using the appropriate switching mechanism present on the user device. As mentioned above, a user may attempt to find offers for goods and services offered by the merchant associated with the merchant website 404. Accordingly, the screen 412 depicts an offers webpage 414 provided by the offers engine 12 that may be opened by the user. The offers webpage 414 may include various elements to display information to a user, and in some instances, receive user input. For example, the offers webpage 414 may include a search field 416, a search control 418, and an offers area 420. The offers webpage 414 may also include various other elements, such as navigation tabs, sign-up and login forms, merchant-specific areas, offer category-specific areas, highlighted offers, ranked offers, and so on. The search field 416 may enable a user to enter a search query and execute a search by selecting the search control 418 (e.g., a search button). The search may include searches for offers, categories of offers, merchants, or any other suitable search queries.

The offers area 420 may present offers, e.g., online coupons 422, for viewing and selection by a user. The offers area 420 may include any number of offers associated with merchants providing goods, services, or a combination thereof. The offers area 420 may present offers based on ranking criteria, user selections (e.g., selections of a merchant, offer categories, etc.) or other parameters. Each coupon 422 may be presented with information associated with the coupon 422, such as a merchant tile 424 and a descriptive text 426. Additionally, each coupon 422 may include a coupon code box 428 having an offer redemption identifier, e.g., a coupon code 430, associated with each coupon 422. The coupon code 430 may be displayed in the coupon code box 428 or other visual element, such as a circle, balloon, etc. Other offer redemption identifiers may also be displayed in a box or other visual element in the offers area 420. As described in detail below, upon selection of one of the coupons 422, the coupon code of a selected coupon may be displayed in a redemption header loaded in the merchant webpage 402. The offer redemption identifier may also include, for example, discount descriptions, rebate, identifiers of free goods or, or any other identifier associated with an offer that enables or describes the redemption of the offer to a user.

The merchant tile 424 may include a text, image (e.g., a merchant logo), or combination thereof identifying the merchant associated with the coupon. The descriptive text 434 may include information about the coupon, such as the goods, services, or both associated with the coupon, the discount or other offer provided by the coupon, the expiration date, or any other suitable information or combination thereof. For example, as shown in FIG. 4B, the coupon 422 may be presented with the merchant tile 424 (e.g., "Merchant1") and descriptive text 426 (e.g., "Save up to 40% on select laptops"). Additionally, the coupon 422 may include the coupon box 428 having the coupon code 430 ("PMPR-SYT8") associated with the coupon 422. Other coupons presented on the offers webpage 414 may include similar information, such as merchant tiles, descriptive text, coupon code boxes, and so on.

To use a coupon, a user may select (e.g., touch, click, etc.) the online coupon 422. For example, a user may select any portion of the coupon 422, such as the merchant tile 424, the descriptive text 426, the coupon code box 428, etc. Upon selection of a coupon, an offer identifier associated with the selected coupon may be stored in a browser-accessible storage item (e.g., a cookie, a SQLite database, a localStorage object, etc.). The browser-accessible storage item may be created upon selection of the coupon 422, or in some embodiments, upon loading of the offers webpage 414. In some embodiments, for example, the browser-accessible storage item may be a session cookie that expires when a session ends (e.g., when the browser is shutdown). As shown FIG. 4C, for example, an offer identifier associated with the selected coupon 422 may be stored in browser-accessible storage item 432. As will be appreciated, the browser-accessible storage item may be accessible to all instances of a browser. In some embodiments, the browser-accessible storage item may be stored locally on the user device. Additionally, in some embodiments, upon selection of an offer from the offers webpage 414, a value of the coupon code may be copied to a clipboard or other temporary storage. For example, upon selection of the coupon 422, the value of the coupon code 430 ("PMPRSYT8") may be copied to a clipboard.

Figure 4D:
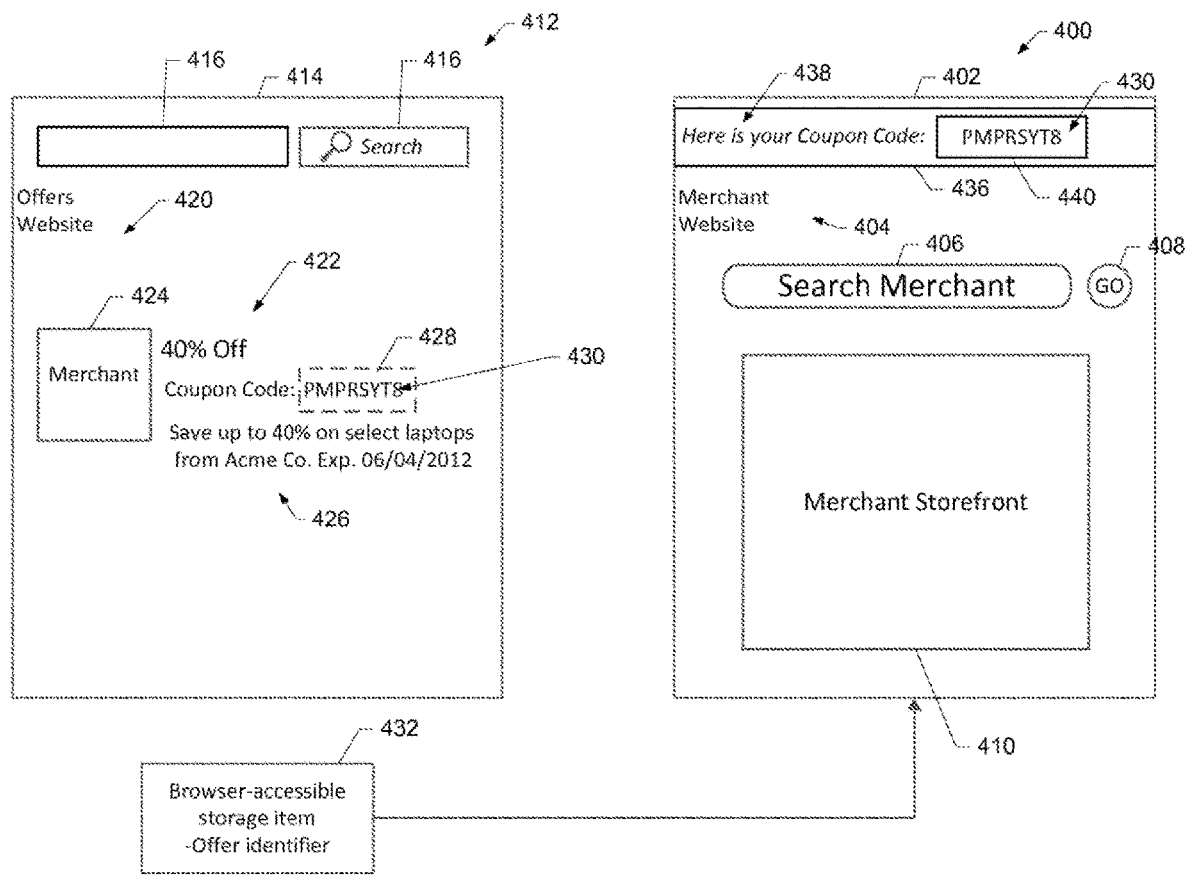

As described further below, upon modification of the browser-accessible storage item (e.g., modification of an existing browser-accessible storage item or creation of a new browser-accessible storage item) to include an offer identifier associated with the selected offer, the redemption header may be retrieved and displayed in the merchant webpage. FIG. 4D depicts screen 400 of the first browser instance and screen 412 of the second browser instance and illustrates the addition of a redemption header 436 to the merchant webpage 402 in response to the modification of the browser-accessible storage item 432. As described in detail below, the redemption header 436 may be added to the merchant webpage 402 to display the offer redemption identifier associated with the selected offer and text (e.g., instructions) associated with redemption of the selected offer. Additionally, the redemption header 446 may be retrieved asynchronously relative to loading of the merchant webpage 402. As described further below in FIGS. 6A and 6B, the merchant webpage in the first browser instance may periodically check for modifications to the browser-accessible storage item 432. Upon modification of the browser-accessible storage item 432, the redemption header 436 may be retrieved and displayed on the merchant webpage 402.

As described above, the merchant webpage 402 may include an empty webpage element, such as an iframe, suitable for displaying the redemption header 436. Upon detection of the modified browser-accessible storage item, the redemption header 436 may be asynchronously retrieved and loaded in the merchant webpage 402. Thus, when a user selects the selected coupon 422 in a second browser instance, the merchant webpage 402 may remain in the first browser instance without interruption by the retrieval of the redemption header 446. As also described further below, this process may include evaluation of the offer identifier to ensure the selected offer corresponds to the merchant associated with the merchant presently loaded in the first browser instance. Additionally, the redemption header 436 may be provided using customizable attributes such as background colors, text colors, fonts, text, text sizes, images, image sizes.

Figure 4E:
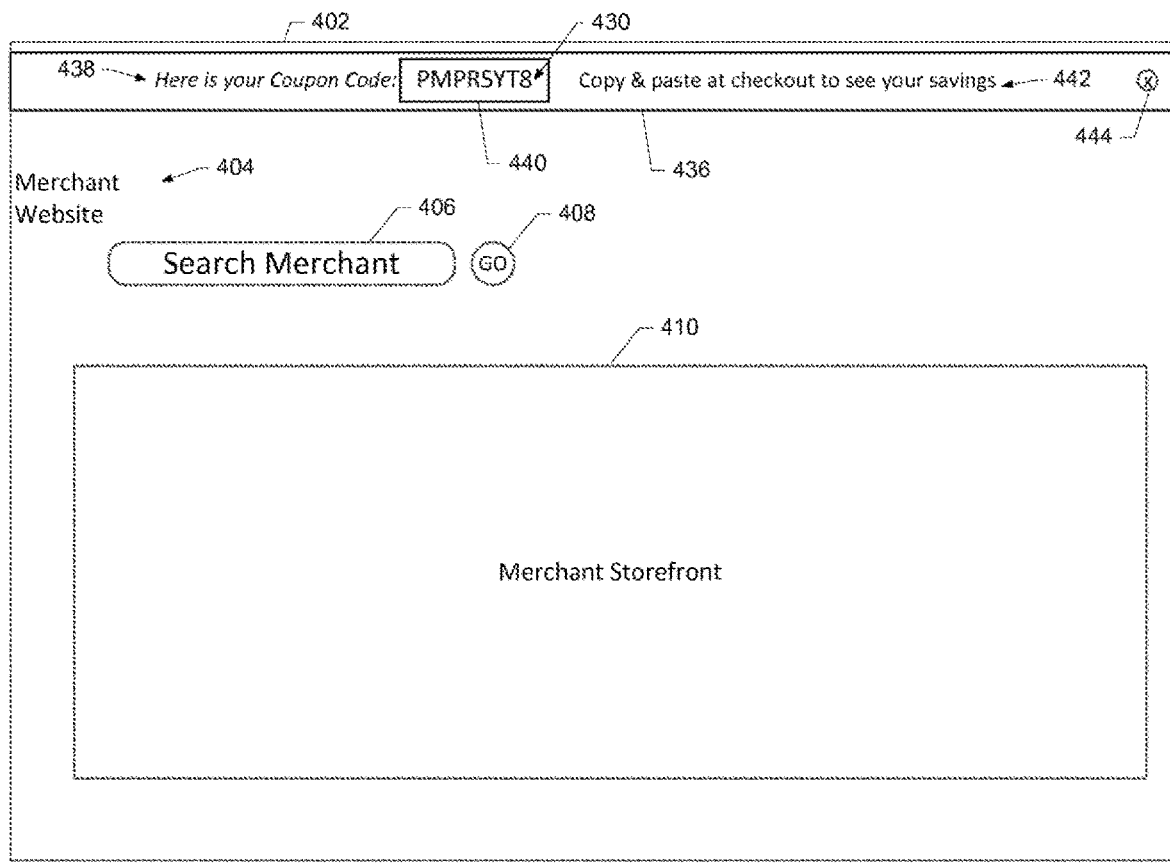

As shown in FIG. 4D, the redemption header 436 may include descriptive text 438, and a coupon code box 440 (additional content of the redemption header 436 is illustrated in FIG. 4E and described further below). The descriptive text 438 may describe the contents, function, or both of the redemption header 436. For example, the descriptive text 438 may include the text "Here is your Coupon Code" describing the contents of the coupon code box 440 presented in the header 436. Accordingly, the coupon code box 440 may include the coupon code 430 ("PMPRSYT8") associated with the selected coupon 422. The descriptive text 438, coupon code box 440, and coupon code 430 may be customized according to customization attributes retrieved from the offers engine 12. For example, the background of the redemption header 436 may have a first color, the descriptive text 438 may have a second color and a first font, the coupon code box 440 may have a third color, and the coupon code 430 may have a second font and fourth color.

In some embodiments, the redemption header 436 may include additional or alternative content, such as user information. For example, the redemption header 436 may include a user identifier associated with a user (e.g., a user name), a user selected image, a shipping address, a billing address, a type of payment (e.g., credit card, debit card, electronic payment and the like), or other user information. In some embodiments, the user information or other content may be retrieved from the offers engine 12.

FIG. 4E depicts the screen 400 of the first browser instance and illustrates the redemption header 436 in greater detail. The redemption header 436 may be provided in the merchant webpage 402, as described in FIGS. 6A and 6B below, and may remain on the other webpages of the merchant website 404 as a user navigates the website 404. Thus, the redemption header "travels" from the merchant webpage 402 to other webpages of the merchant website. By retaining the redemption header 436, a user may have access to the coupon code 430 required to redeem the coupon 422 and instructions and other text associated with the selected coupon 422. As shown in FIG. 4E, the redemption header 436 may include the descriptive text 438, the coupon code box 440, instructions 442, and a close control 444 (e.g., a close button). The instructions 442 may provide instructions to the user on how to use the coupon code 430 and redeem the selected coupon 422. For example, as shown in FIG. 4E, the instructions 442 include the text "Copy & paste at checkout to see your savings." Here again, the additional content of the redemption bar illustrated in FIG. 4E may be customized according to customization attributes retrieved from the offers engine 12.

Figure 4F:
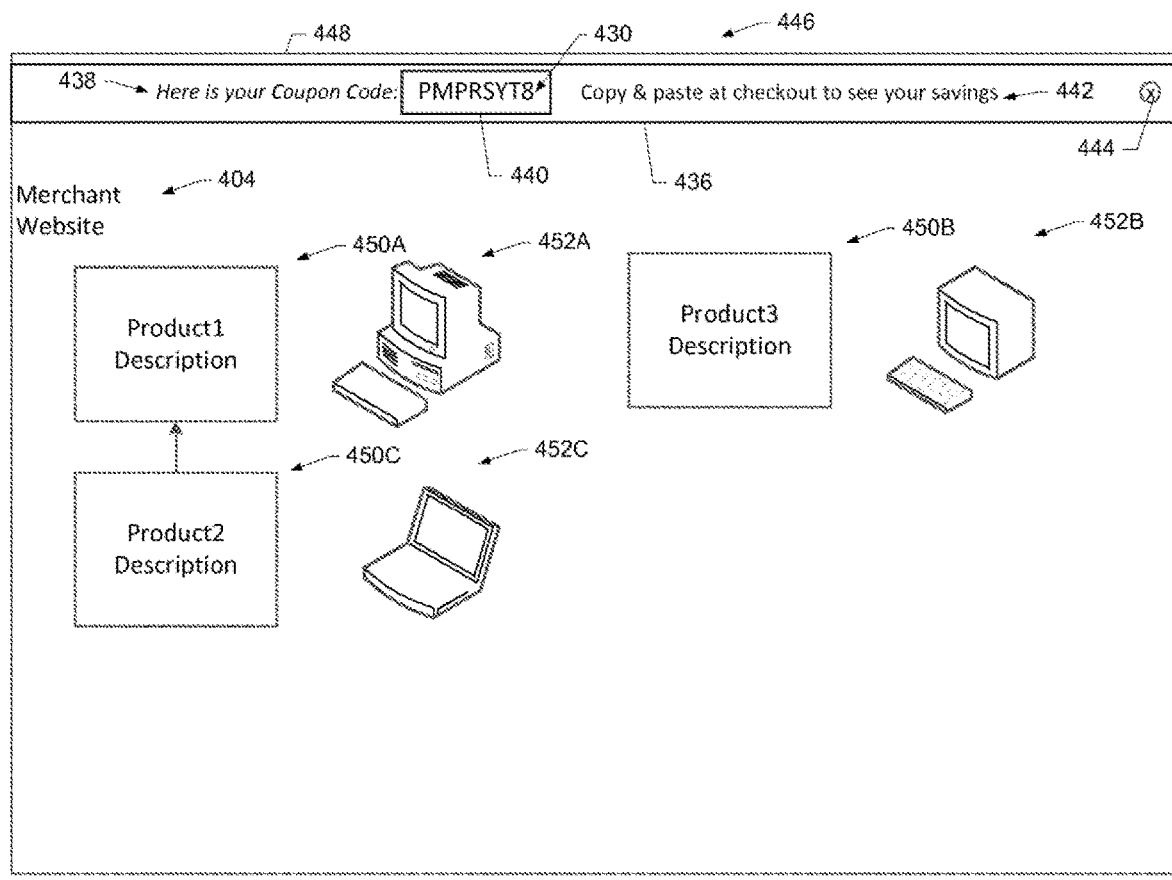

As mentioned above, a user may navigate the merchant website 404 by selecting the search button 408, selecting links in the merchant storefront 410, and so on. In response, various webpages of the merchant website may be requested and displayed by the web browser. The redemption header 436 may remain in such webpages until the user selects the close control 444. Thus, regardless of the portion of the merchant website 404 displayed by the web browser, the redemption header 436 (and coupon code 420) may remain accessible to the user. For example, FIG. 4F depicts another screen 446 of a browser illustrating another webpage 448 of the merchant website 404 in accordance with an embodiment of the present invention. As shown in FIG. 4F, the webpage 448 of the merchant website 404 may include a product listing having product text 450 and product images 452. For example, the webpage 448 may include product text 450A and product image 452A associated with a first product, product text 450B and product image 452B associated with a second product, and so on. A user may navigate to the webpage 448 by searching for a product, selecting links in the merchant storefront 410, or other navigation actions within the merchant website 404. Moreover, as shown in FIG. 4F the redemption header 436 remains (i.e., travels to) in the webpage 448. Thus, while a user is viewing various products on the webpage 448, the redemption header 436 may remain to allow access to the information associated with the selected coupon 422.

Figure 4G:
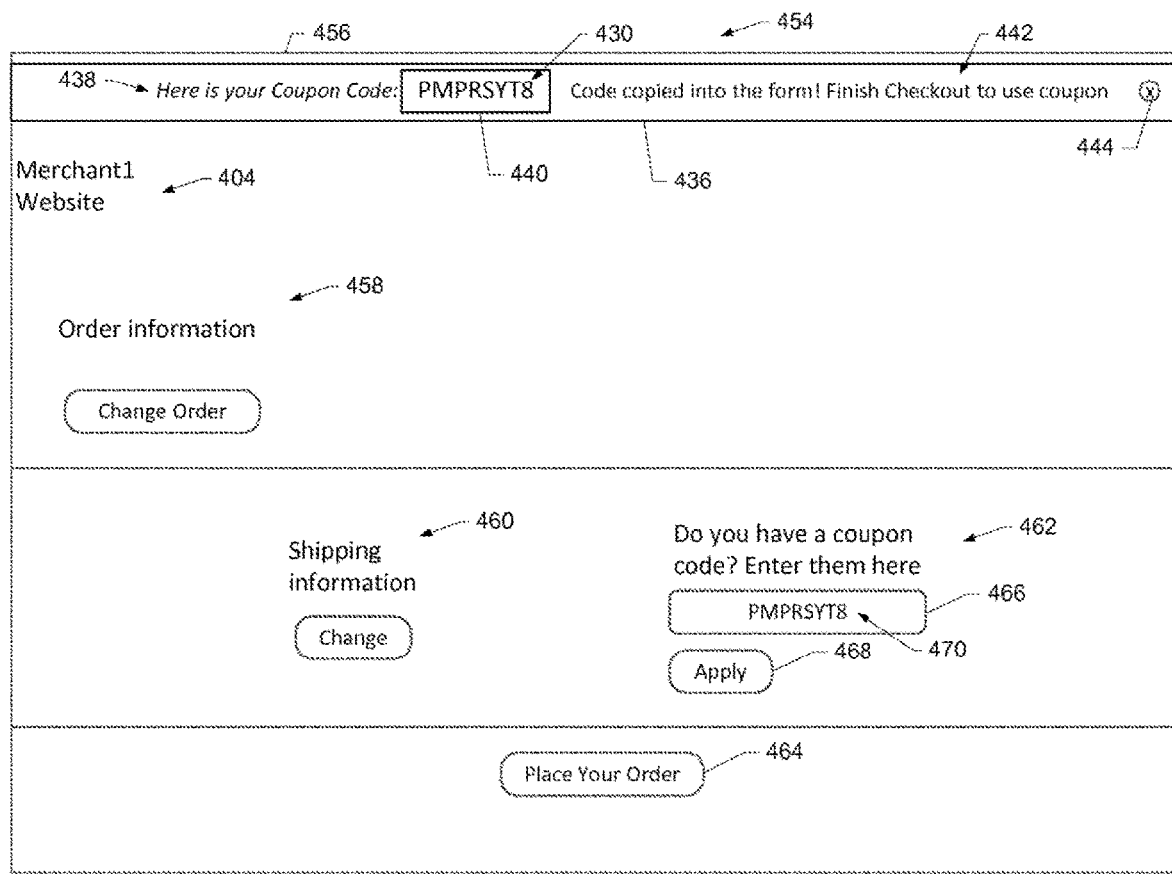

As described above, a user may use the merchant website to order goods and services associated with the selected coupon, such as by adding the goods and services to a virtual "shopping cart" and selecting an option to checkout. FIG. 4G depicts a screen 454 of the browser illustrating a checkout page 456 of the merchant web site 404 in accordance with an embodiment of the present invention. As described above, web content such as the checkout page 456 may be retrieved from the Internet via a network accessible by a user device executing the browser, and this web content may be displayed by a browser. As shown in FIG. 4G, the redemption header 436 may remain in the checkout webpage 456 and may include the coupon code box 440 and the coupon code 430. The redemption header 436 may remain accessible while a user completes a transaction, e.g., an order for goods, services, or both with the merchant. Here again, a user may remove the redemption header 436 by selecting the close control 444.

The merchant checkout page may include various web content that enables a user to view and enter order information and complete an order for goods, services, or both. For example, the merchant checkout page 456 may include an order information portion 458, a shipping information portion 460, a code entry portion 462, and a checkout button 464. The merchant checkout page 456 enables a user to enter a shipping address, a billing address, payment information, and the like. By selecting the checkout button 464 ("Place Your Order") a user may submit an order for fulfillment by the merchant. The order information portion 458 may include order information, such as products or services in the order, quantities, prices, payment information, etc., and may include a button or other control for changing the order. Similarly, the shipping information portion 460 may include shipping address, a billing address, and other shipping information and may include a button or other control to enable a user to change the shipping information. The code entry portion 462 may enable a user to enter coupon codes, promotional codes, gift card codes, or any other codes that may be applied to an order. The code entry portion 462 may include an input field 466 (e.g., a text field that receives text input) and a submission button 468 ("Apply"). By entering a coupon code or other code into the input field 466 and selecting the submission button 468, a user may submit a coupon code to apply a coupon associated with the merchant. In some embodiments, the input field 466 may accept images or other input.

As shown in FIG. 4G, the input field 466 may be automatically populated ("auto-populated") with a coupon code value 470 of the coupon code 430. For example, the code associated with the redemption header 436 may detect the input field 466 when the code is executed and the redemption header 436 is loaded, and the coupon code value 470 may be automatically entered into the input field 466. In some embodiments, a <div> tag, <form> tag, <input> tag, or other element including the input field 466 may be detected to detect the input field 466. In yet other embodiments, a merchant may specifically identify the webpage element of the input field 466 or may identify the input field 466 using a standardized identification.

In other embodiments, a user may enter the value associated with the coupon code into the input field 466 by pasting a value of the coupon code 430 from the clipboard into the input field 466. As mentioned above, the value 470 corresponding to the coupon code 430 may be copied to a clipboard or other temporary storage upon selection of the selected coupon. A user may then paste the contents of the clipboard into the input field 466 to enter the coupon code value 470 into the input field 466, and a user does not need to memorize the coupon code or manually type the code directly into the input field 466. Alternatively, a user may type or otherwise enter the coupon code value 470 into the input field 466 and may easily obtain the coupon code from the redemption header 436 included in the checkout webpage 456. Thus, the coupon code value 470 may be entered into the input field 466 by merely pasting the contents of a clipboard or other temporary storage into the input field 466 or by auto-populating the input field 466. A user may then select the submission button 468 to apply the coupon code to the order. After application of the coupon code 430, a user may submit the order to the merchant by selecting the checkout button 464.

Although FIG. 4G is described with reference to an input field of a checkout webpage associated with a merchant, it should be appreciated that the same techniques may apply to input fields located in any webpage associated with a merchant that may receive a coupon code and for which a user desired to enter the code. For example, a shopping cart webpage, a product webpage, or other merchant webpages may have an input field that may be processed in the manner described above.

Figure 4H:
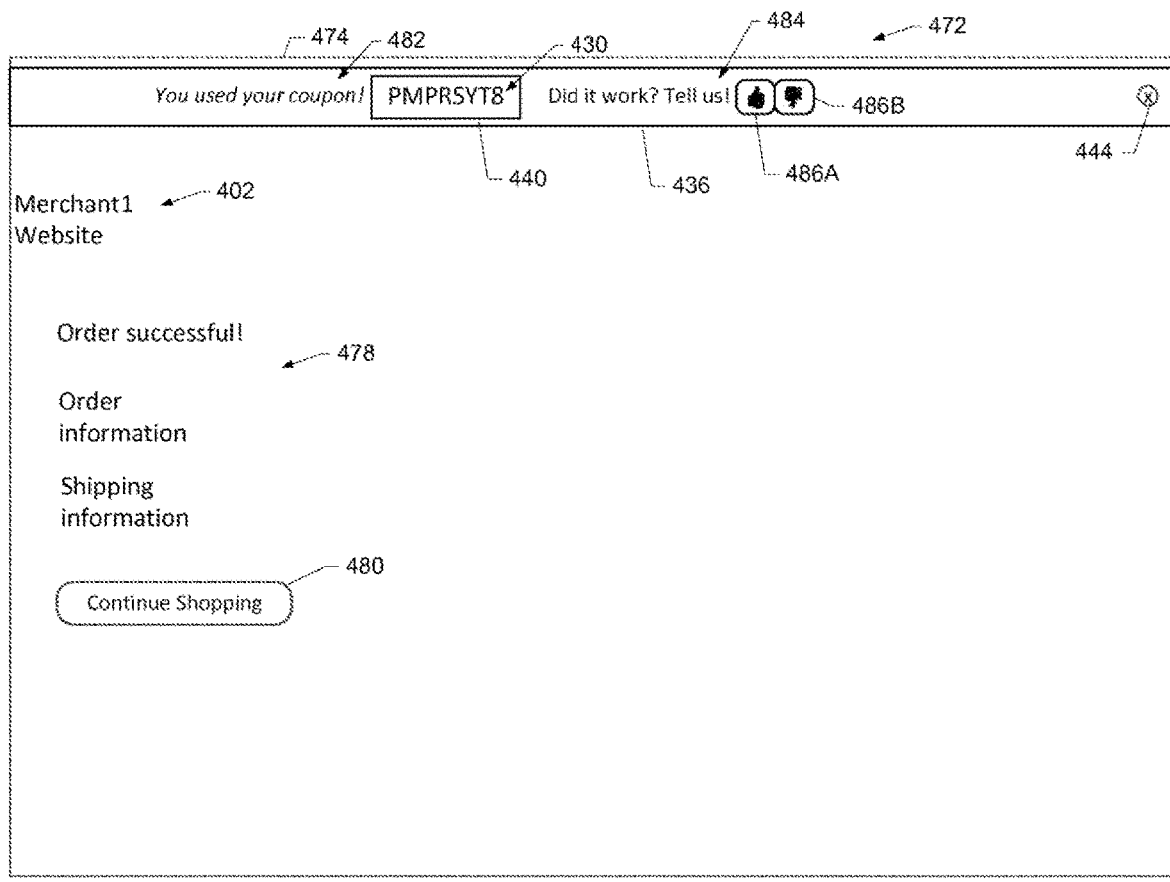

In some embodiments, as shown in FIG. 4H, the redemption header 436 may provide a user feedback mechanism in response to submission of an offer redemption identifier, e.g., the coupon code 422. After an offer redemption identifier is submitted, the redemption header 436 may change based on the different webpage or changed web content. FIG. 4H depicts a screen 472 of a browser illustrating an order confirmation webpage 474 in accordance with an embodiment of the present invention. For example, after a user submits an order, such as from the checkout page 456 depicted in FIG. 4G, a user may be presented with the order confirmation webpage 474. The order confirmation webpage 474 may include order information 478 and a "Continue Shopping" button 480. The order information 478 may include a verification of order submission ("Order successful!"), order information, shipping information, or any other information associated with an order. The "Continue Shopping" button 480 may enable a user to navigate to additional webpages of the merchant website 404, such as by returning to a merchant storefront or a product webpage.

As shown in FIG. 4H, in response to the submission of the coupon code 430, the redemption header 436 may include different content, such as a user feedback request 484. As shown in FIG. 4H, the redemption header 436 may include confirmation text 482 ("You used your coupon!") and user feedback controls 486 (e.g., a thumbs-up button and a "thumbs-down" button). A user may indicate the success of the selected coupon by selecting the feedback button 486A and the failure of the selected coupon by selecting the feedback button 486B. Upon selection of one of the controls 486A or 486B, the selection may be transmitted to the offers engine 12. In this manner, user feedback regarding the success or failure of an online coupon or other offer may be collected and used for offer analysis, offer ranking, affiliate payments, merchant payments, or other purposes.

As mentioned above, in some embodiments, submission of an offer redemption identifier, such as a coupon code, may be detected. In such an embodiment, for example, the code associated with the redemption header 436 may detect a click event associated with the submission button 468. Alternatively, in some embodiments a URL pattern for a receipt page responsive to the submission may be detected. Additionally, the data included in the request method may be parsed and analyzed to determine that the offer redemption identifier was submitted. Thus, if an offer redemption identifier is determined as being submitted, then the user feedback request 484 may be provided in the redemption header 436. In other embodiments, the submission of an order may be detected and the user feedback request may be provided in the manner described above in response to the order submission.

Figure 4I:
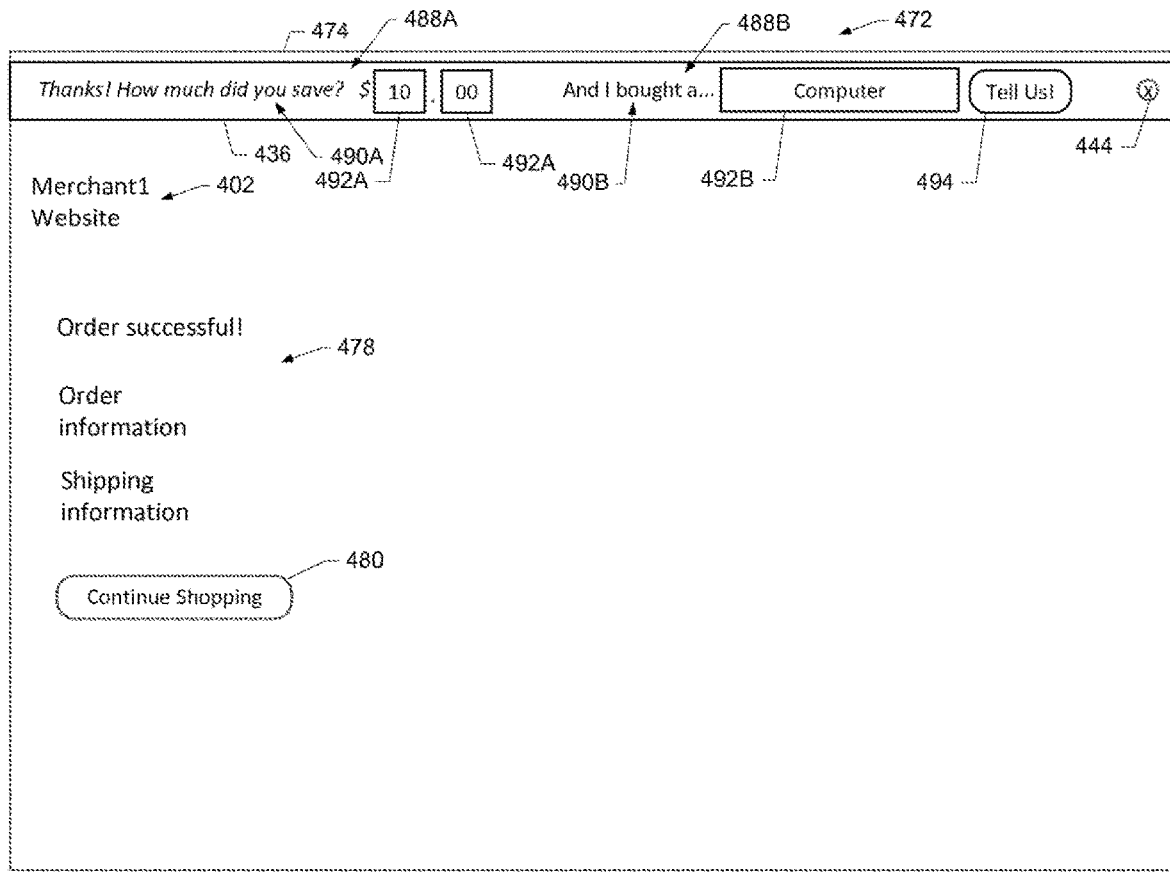

In some embodiments, additional user feedback requests may be provided in response to a user's feedback. For example, if a user provided feedback in response to a user feedback request, a second user feedback request 488 may be provided that requests additional information from the user. FIG. 4I depicts the screen 472 of the order confirmation webpage 474 illustrating a second user feedback request displayed in the redemption header 436. As shown in FIG. 4I, after a user selects one of the feedback controls 486, such as the "thumbs-up" button 486A to indicate that the coupon was successful, additional user feedback requests 488 may be retrieved and displayed in the redemption header 436. For example, a user feedback request 488A may include a user feedback text 490 ("Thanks! How much did you save?") and a feedback field 492, such as a field that requests the amount of money saved by the user. The redemption header 436 may also include an additional user feedback request 488B ("And I bought a . . . ") that includes user feedback text 490B and user feedback field 492B, such as a text field that requests the product purchased by a user. The redemption header 436 may also include a user feedback control 494 that enables a user to submit a response to the additional user feedback requests 488. Additionally, a user may remove the redemption header 436, before or after responding to the additional user feedback request 488, by selecting (e.g., clicking, touching, etc.) the close control 444. In some embodiments, the redemption header 436 may be removed after a user submits a response to the user feedback request 488. For example, after submitting user feedback by selecting (e.g., clicking, touching, etc.) the close control 444, the redemption header 436 may be removed from the order confirmation webpage 474 and any subsequent web pages of the merchant website 404 accessed by the user.

Figure 5A:
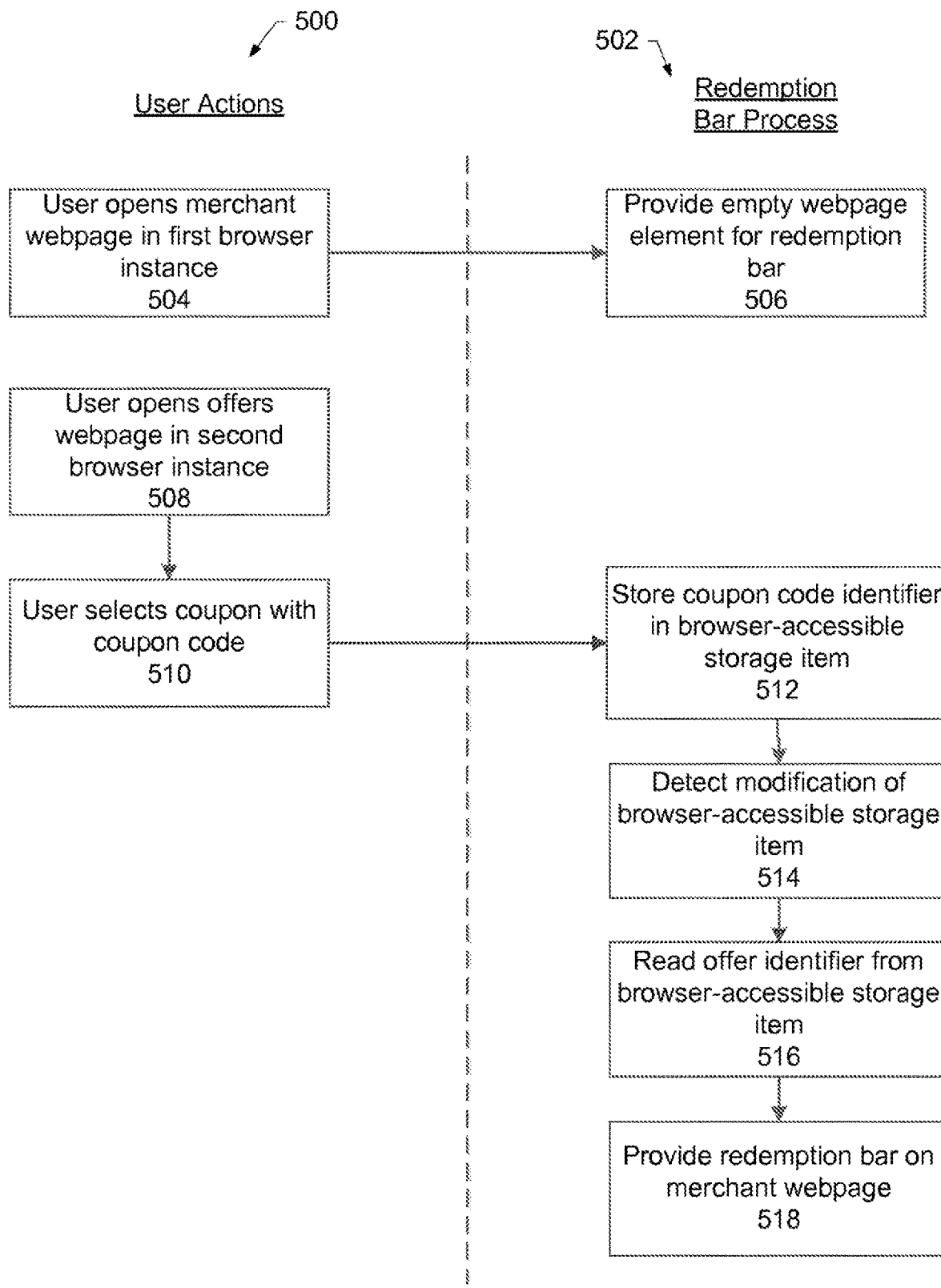
FIGS. 5A and 5B are block diagrams illustrating user actions and a customizable redemption header process in accordance with an embodiment of the present invention.
Figure 5B:
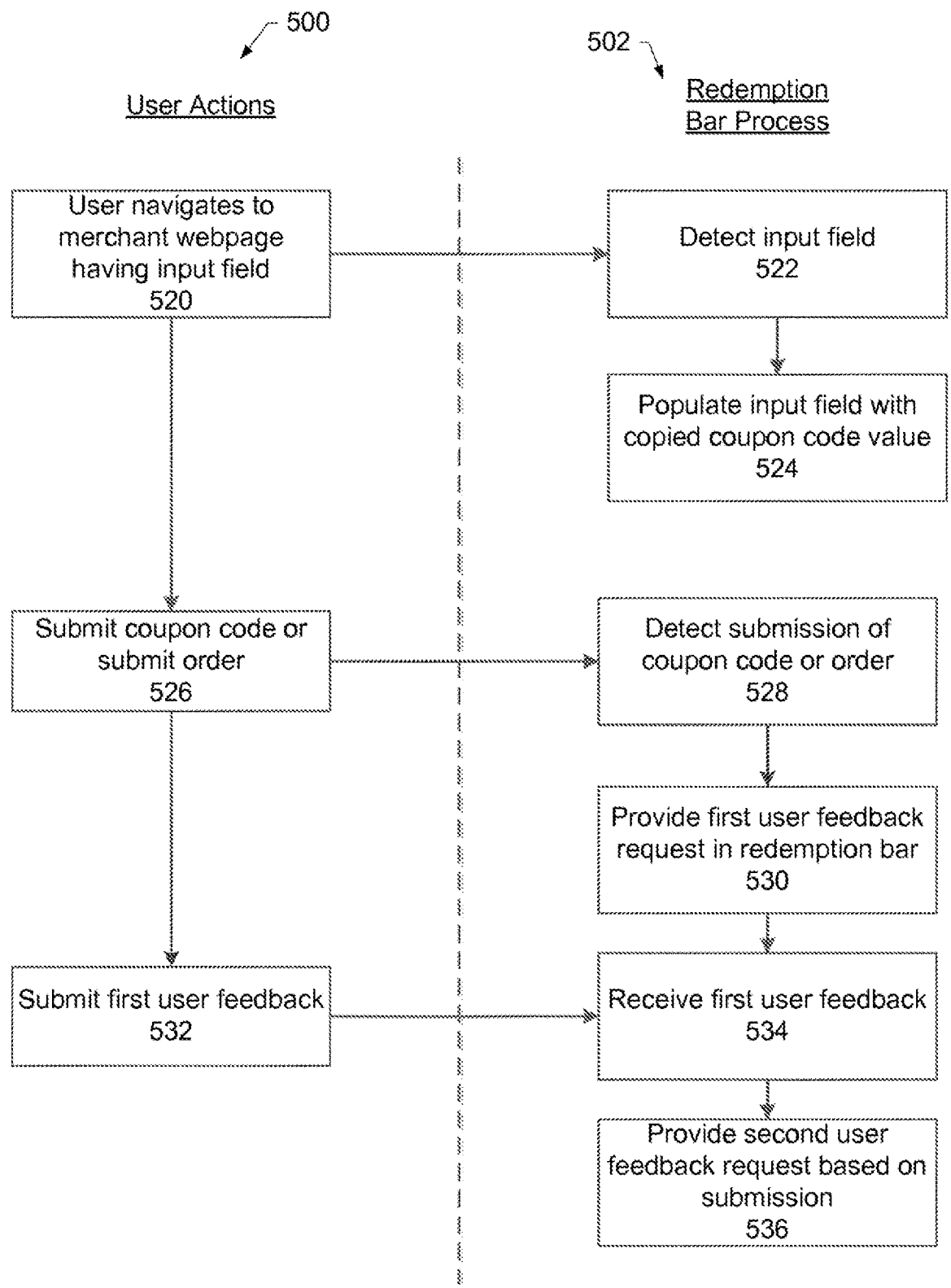

FIGS. 5A and 5B depict user actions 500 and a redemption header process 502 in accordance with an embodiment of the present invention. Some or all steps of the process 502 may be implemented as executable computer code stored on a non-transitory tangible computer-readable storage medium and executed by one or more processors of a special-purpose machine, e.g., a computing device programmed to execute the code. Initially a user may open a merchant webpage of a merchant website in a first browser instance (block 504), as described above and illustrated in FIG. 4A. For example, as described above, a merchant webpage may be requested from one or more merchant webservers and provided to the browser. Additionally, as noted above, an empty webpage element capable of including a redemption bar, e.g., a redemption header, may be provided in the merchant webpage (block 506). Next, a user may open an offers webpage in a second browser instance (e.g., a new browser window, new browser tab, etc.) (block 508), such as described above and illustrated in FIG. 4B. As mentioned above, the offers webpage may be requested from and provided by the offers engine 12.

After opening an offers webpage in a second browser instance, a user may select an offer, e.g., an online coupon, having an offer redemption identifier, e.g., a coupon code (block 510). In some embodiments, after selection of an offer, a value corresponding to the offer redemption identifier, e.g., a coupon code, associated with the selected offer may be copied to a clipboard or other temporary storage. After the selection of an offer, an offer identifier may be stored in a browser-accessible storage item (e.g., a cookie, a SQLite database, a localStorage object, etc.) (block 512), as described above and illustrated in FIG. 4C. Next, modification of the browser-accessible storage item, such as the storage of the offer identifier in the browser-accessible storage item, may be detected by the merchant webpage (block 514). The offer identifier may be read from the browser-accessible storage item (block 516), as described above and illustrated in FIG. 4D. After reading the offer identifier, a redemption bar may be provided in the empty webpage element on the merchant webpage (block 518), as described above and illustrated in FIG. 4E. A user may then perform other actions to interact with the redemption bar and merchant webpages. For example, a user may select the close control of the redemption bar and, in response, the redemption bar may be removed from the merchant webpage.

FIG. 5B depicts additional user actions 500 and additional steps of the redemption process 502 in accordance with an embodiment of the present invention. As described above, a user may also search and browse a merchant website to purchase goods, services, or both associated with the coupon. Subsequently, a user may navigate to a merchant webpage having an input field to complete an order for goods, services, or both, such as a checkout webpage, a shopping cart webpage, or other merchant webpage having an input field configured to receive an offer redemption identifier, e.g., a coupon code (block 520). After a user navigates to a merchant webpage having a particular input field, the input field may be detected (block 522), as described below in FIG. 7. After detection of the input field, the input field may be populated with the value of the offer redemption identifier of the selected offer (block 524).

After the offer redemption identifier, e.g. coupon code, is entered into the input field, a user may submit the offer redemption identifier for redemption or submit an order to complete the order (block 526). As described above in FIG. 3, redemption of offers, such as a selected coupon, may occur through an affiliate network or directly from a merchant. After a user selects a submission, such as a submission of a coupon code, an order, etc., the submission may be detected (block 528). Based on the detection of the submission, a first user feedback request may be provided in the redemption bar (block 530), as described and illustrated in FIG. 4H. Next, a user may submit user feedback (block 532), such as by entering input into user feedback fields and selecting a user feedback control. The user feedback may be received (block 534) and used for offer analysis, offer ranking, affiliate payments, merchant payments, or other purposes. Next, a second user feedback request may be provided in response to the submission of the first user feedback (block 536), as described above and illustrated in FIG. 4I. The user feedback request process is described further below in FIG. 8. As will be appreciated, second user feedback may be received in response to the second user feedback request. Moreover, in some embodiments, additional user feedback requests may be provided. In some embodiments, after submission of user feedback in response to all user feedback requests, the redemption bar may be removed from the merchant webpage.

Figure 6A:
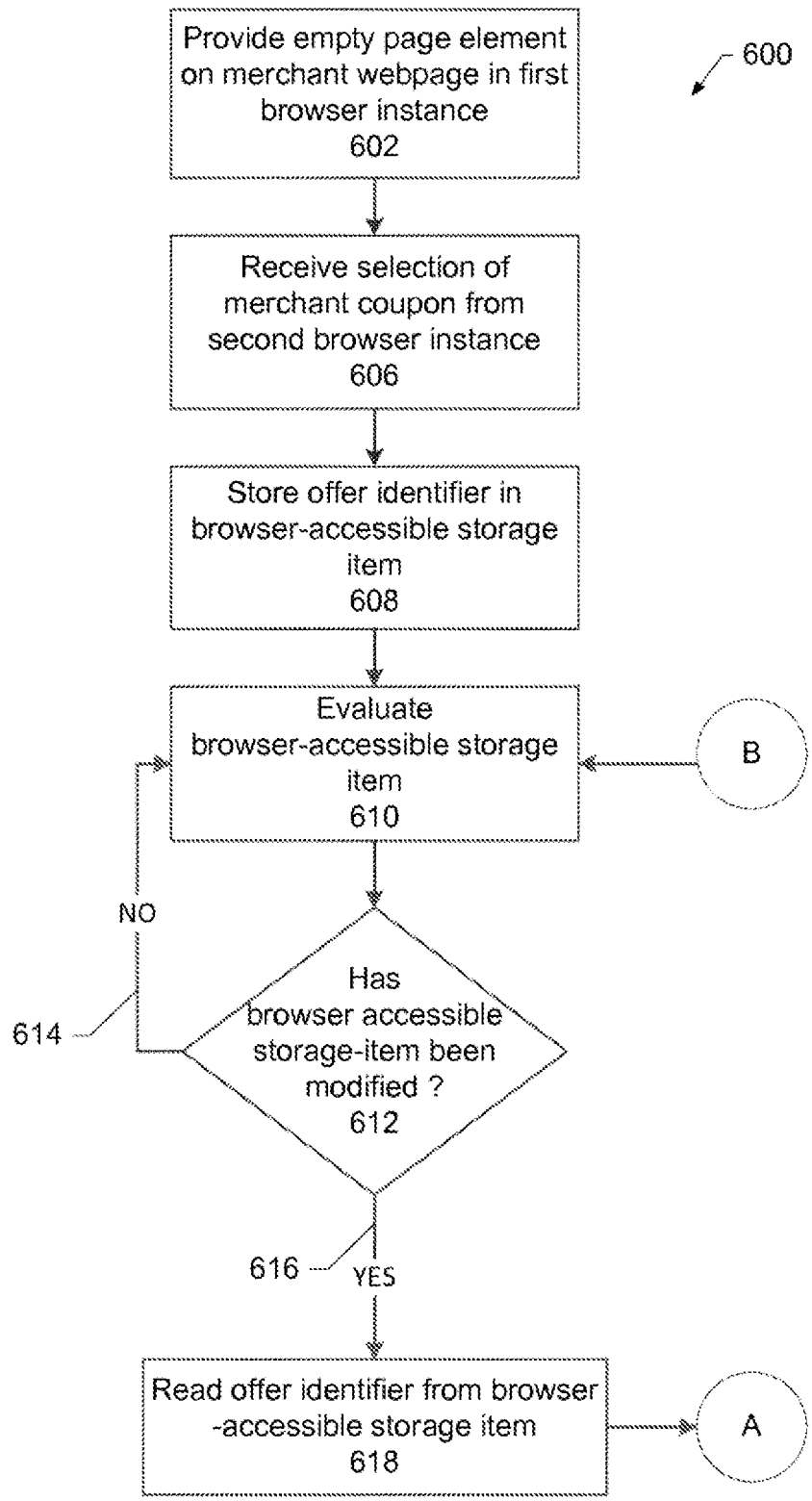
FIGS. 6A and 6B are block diagrams for providing a customizable redemption header in accordance with an embodiment of the present invention.
Figure 6B:
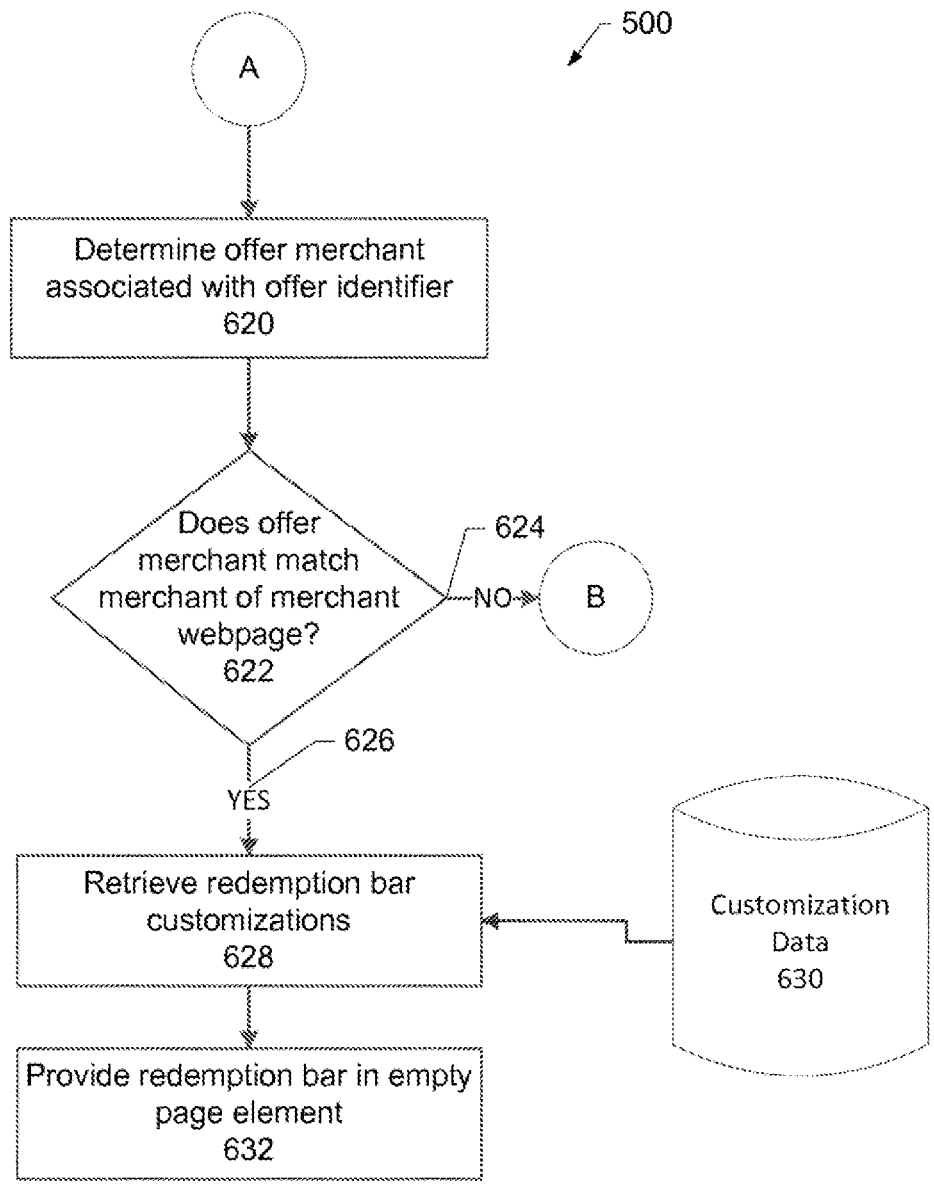

FIGS. 6A and 6B depict a process 600 for providing a customizable redemption header in accordance with an embodiment of the present invention. Some or all steps of the process 600 may be implemented as executable computer code stored on a non-transitory tangible computer-readable storage medium and executed by one or more processors of a special-purpose machine, e.g., a computing device programmed to execute the code. As shown in FIG. 6A, and as described above, an empty webpage element, such as an empty inline frame, may be provided on a merchant webpage in a first browser instance (block 602). Next, a user selection of a merchant offer on an offers webpage in a second browser instance may be received (block 606). A browser accessible storage item (e.g., a cookie, a SQLite database, a localStorage object, etc.) may be created and an offer identifier may be stored in the browser-accessible storage item (block 608).

Next, the browser-accessible storage item may be evaluated (block 610) to determine if the browser accessible storage item has been modified (decision block 612). This determination may include determining if the browser-accessible storage item was created, if an offer identifier was stored in the browser-accessible storage item, and so on. For example, in some embodiments a webpage may be requested from the offers engine 12 and the existence of the browser-accessible storage-element based on the request may be determined. If the browser accessible storage-item has not been modified or does not exist (line 614), the process 600 may continue to check for modification of the browser-accessible storage item (block 610). In some embodiments, for example, the modification of the browser-accessible storage item may be checked every second, every 2 seconds, every 4 second, every 5 seconds, every 30 seconds, every minute, or every 5 minutes or greater. If the browser-accessible storage item has been modified (line 616), then the offer identifier may be read from the browser-accessible storage item (block 618).

FIG. 6B depicts further details of the process 600, as illustrated by connection block A. As shown in FIG. 6B, after reading the offer identifier, the merchant providing the offer ("offer merchant") associated with the offer identifier may be determined (block 620). For example, the offer merchant may be retrieved from the offers engine 12 based on the offer identifier. The offer merchant may be compared to the merchant associated with the merchant webpage loaded in the first browser instance (decision block 622). If the offer merchant does not match the merchant associated with the merchant webpage (line 624), then the process 600 may continue to check for modification of the browser-accessible storage item (block 610), as illustrated by connection block B in FIGS. 6A and 6B. Thus, if the offer merchant does not match the merchant associated with the merchant website, the redemption header may not be provided on the merchant website, as the offer is not applicable to the merchant and cannot be used on the merchant website. In some embodiments, for example, the offers engine 12 may return a value of "false" if the offer merchant does not match the merchant associated with the merchant webpage and return a value of the offer redemption identifier if the offer merchant matches the merchant associated with the merchant webpage.

If the offer merchant matches the merchant associated with the merchant website loaded in the first browser instance (line 626), customizations for the redemption bar may be retrieved (block 628) from customization data 630. The customization data may include, for example, background colors, text colors, fonts, text, text sizes, images, image sizes, and other customizations to the redemption bar. After retrieving the specific customizations for the redemption bar, the redemption bar may be provided in the empty webpage element on the merchant webpage (block 632) loaded in the first browser instance. As described above, providing the redemption bar may include providing images, text, and other components that form the redemption header to the browser. In some embodiments, the static content such as images and text associated with the redemption header may be provided from a CDN (e.g., a CDN having a cookieless domain) and may be compressed to optimize transmission and loading time. Additionally, in some embodiments, the size and number of content associated with the redemption header may be minimized to facilitate faster transmission and loading time. The redemption header may then be displayed in the merchant webpage loaded in the first browser instance.

As described above, after the redemption header is provided, a user may select the close control to remove the redemption header from the merchant webpage. In such embodiments, a message may be asynchronously provided to remove the redemption header (and the associated webpage element) from the merchant webpage and to remove the browser-accessible storage item. The redemption header may remain removed from the merchant webpage until the user returns to the offers webpage and selects a new offer.

Figure 7:
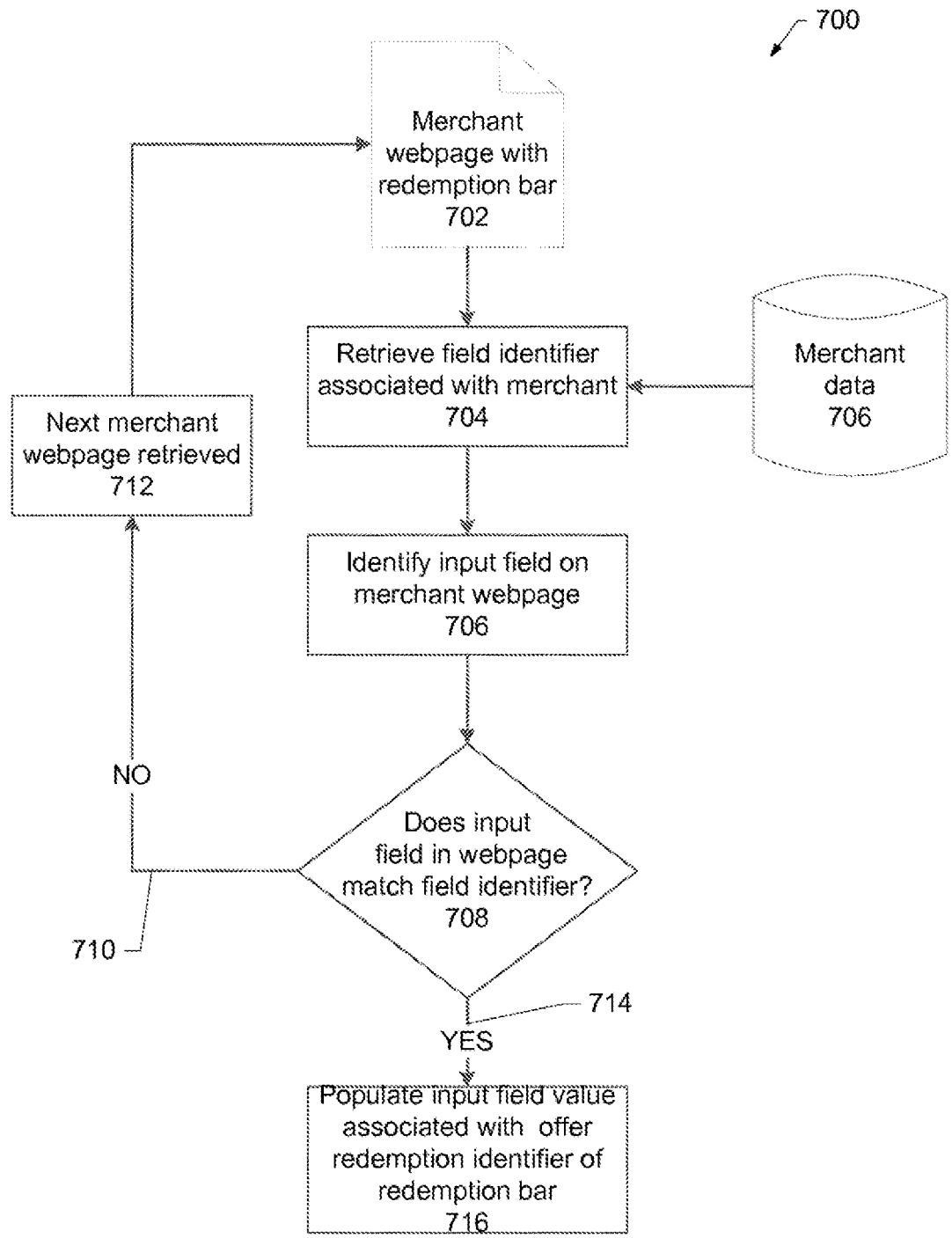
FIG. 7 is a block diagram of a process for populating an input field of a merchant webpage with an offer redemption identifier in accordance with an embodiment of the present invention.

FIG. 7 depicts a process 700 for populating an input field of a merchant webpage with an offer redemption identifier in accordance with an embodiment of the present invention. Some or all steps of the process 700 may be implemented as executable computer code stored on a non-transitory tangible computer-readable storage medium and executed by one or more processors of a special-purpose machine, e.g., a computing device programmed to execute the code. As described above and illustrated in FIG. 4C, a merchant webpage 702 having a redemption bar may be loaded in a browser instance on a client device. As described above, a user may open a merchant webpage in a first browser instance, and a redemption bar may be provided on the merchant webpage in response to the selection of an offer in a second browser instance. As also described above, the merchant webpage may include one or more input fields for entering data, such as an offer redemption identifier, e.g., a coupon code.

After the redemption bar is provided on the merchant webpage 702, a field identifier associated with the merchant may be retrieved (block 704), such as from merchant data 706 of the offers engine 12. For example, merchant data 706 may be a database or other data repository that stores a list of merchants and corresponding input fields for receiving offer redemption identifiers. The merchants may be identified by name, a numeric identifier, or other suitable identifiers. In some embodiments, the field identifiers may be provided directly from a merchant to the offers engine 12 or, in other embodiments, the identification of input fields may be determined (e.g., by scraping or other means") from the content of merchant webpages.

Next, the input fields on the merchant webpage may be identified (block 706). For example, a webpage element associated with an input field, such as an HTML tag or other webpage element included in the merchant webpage, may be identified. The input field may be compared to the field identifier associated with the merchant to determine if the input field matches the field identifier (decision block 708). If the input field does not match the field identifier associated with the merchant (line 710), process 700 may continue when another merchant webpage is retrieved and loaded in the browser instance (block 712). It should be appreciated that although the process 700 illustrates the identification of an input field, multiple input fields may be identified in the process 700. For example, multiple field identifiers may be consecutively or concurrently retrieved, and multiple input fields may be consecutively or concurrently retrieved and matched to the field identifiers.

If the input field matches the field identifier associated with the merchant (line 714), the input field may be populated with the offer redemption identifier (block 716). As explained above, the offer redemption identifier may be stored in clipboard or other temporary memory and may be automatically pasted from the clipboard to the input field identified by the field identifier. Accordingly, as shown above in FIG. 4G, when a user navigates to a merchant webpage having an input field for receiving an offer redemption identifier, a value of the offer redemption identifier displayed in the redemption bar may be automatically populated into the input field.

Figure 8:
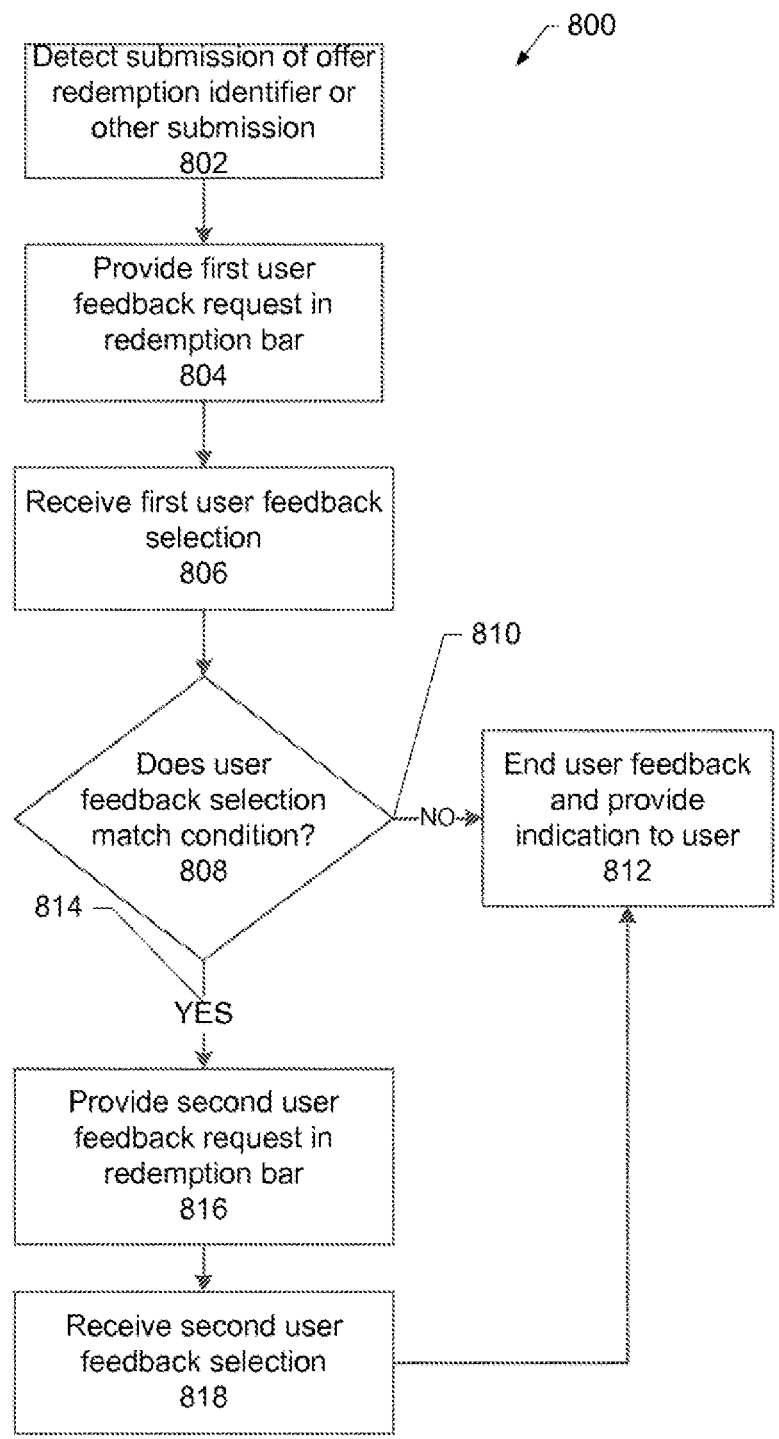
FIG. 8 is a block diagram of a process for providing user feedback requests in a customizable redemption header in accordance with an embodiment of the present invention.

FIG. 8 depicts a process 800 for providing user feedback requests in a redemption bar in accordance with an embodiment of the present invention. Initially, the submission of an offer redemption identifier, e.g., a coupon code, or other submissions may be detected (block 802). In some embodiments, the submission of an order or other submission on a merchant webpage may be detected. After detecting submission of an offer identifier or another submission, a user feedback request may be provided in the redemption bar (block 804). For example, as described above, images, text, and other content for the user feedback request may be asynchronously retrieved from the offers engine 12 and provided in the redemption bar. After providing a user feedback request, user feedback may be received from a user (block 806), such as a selection of a user feedback control, text input in a user feedback field, and the like.

Next, the user feedback may be evaluated to determine if the user feedback matches a condition (block 808). Such conditions may include, for example, if a specific user feedback control was selected, if text input matches a specific string, if a numeric input is above or below a specific value, or any other suitable conditions. If the user feedback does not match the specified condition (line 810), the user feedback requests may be ended and an indication may be provided to a user (block 812). For example, text and other content may be retrieved and provided in the redemption bar that indicates to the user that the transaction and user feedback requests are complete.

If the user feedback matches the specified condition (line 814), a second user feedback request may be provided in the redemption bar (block 816). Here again, as described above, images, text, and other content for the second user feedback request may be asynchronously retrieved from the offers engine 12 and provided in the redemption bar. Next, second user feedback may be received from the user (block 818), such as selection of a user feedback control, text input in an input field, and the like. After receiving the second user feedback, the user feedback requests may be ended and an indication, such as text and other content retrieved and provided in the redemption bar, may be provided to a user (block 812). Although only two user feedback requests are described above and illustrated in FIG. 8, it should be appreciated that, in some embodiments, three, four, five, or more user feedback requests may be consecutively provided in the manner similar to that described above. Alternatively, only one user feedback request may be provided in some embodiments.

As described above, in some embodiments a redemption bar may be customized by retrieving customization data from the offers engine 12. The customizations may include customizations to the appearance and content of the redemption bar. Additionally, an administrator, such as administrator associated with a merchant, may be able to change the customizations for a particular implementation of the redemption bar used on a merchant website.

Figure 9:
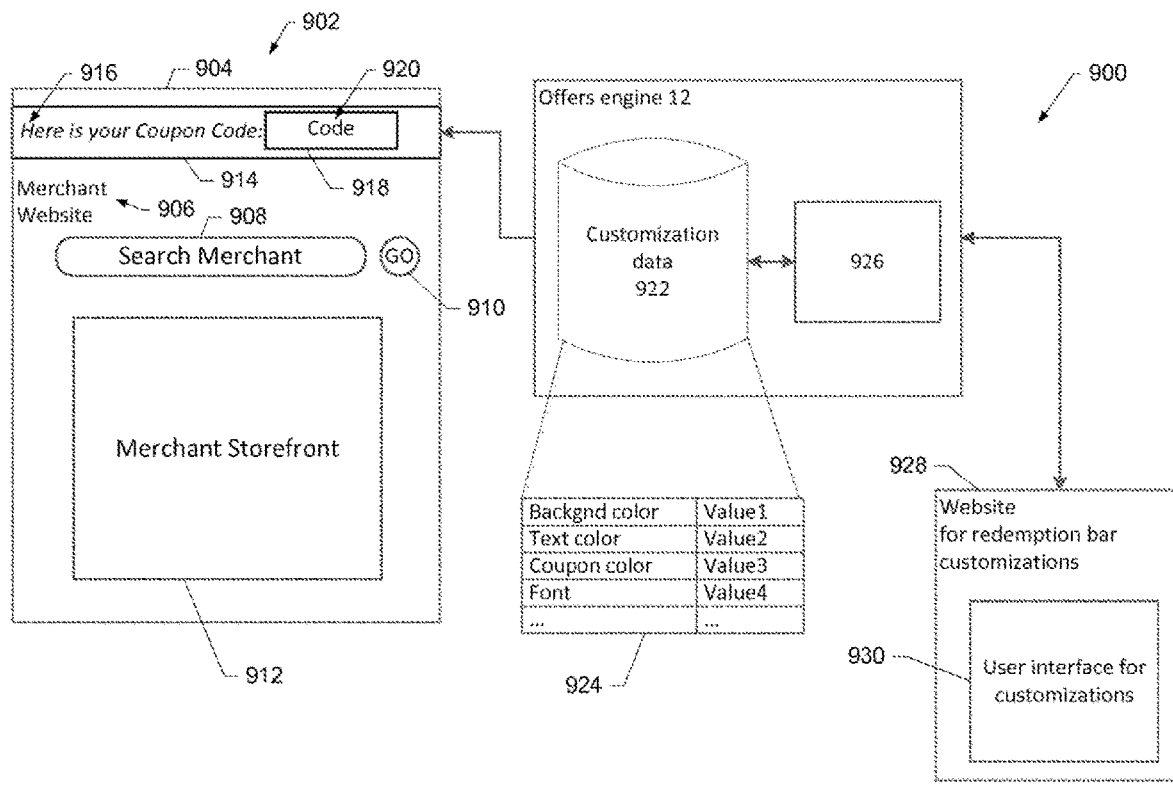
FIG. 9 is a block diagram of a system for customizing a redemption header in accordance with an embodiment of the present invention.

FIG. 9 depicts a system 900 for providing redemption bar customizations in accordance with an embodiment of the present invention. As shown in FIG. 9, a screen 902 of a browser instance depicts a merchant webpage 904 of a merchant web site 906 loaded in the browser instance in the manner described above. The merchant webpage 904 may include, for example, a search field 908, search button 910, and a merchant storefront 912 similar to the embodiments described above. As also shown in FIG. 9, a redemption bar 914 may be provided on the merchant webpage 904 in the manner described above. The redemption bar may include, for example, descriptive text 916, a coupon code box 918, and an offer redemption identifier, e.g., a coupon code 920. It should be appreciated that the redemption bar 914 may include other content, such as text, images, and the like, as described above.

As shown in FIG. 9, the offers engine 12 may include customization data 922 that includes customizations for the redemption bar 914. The customization data 922 may be stored in a database or other data repository. For example, FIG. 9 depicts a data structure 924, such as a table, object or other structure, that may store customization attributes and corresponding values. As shown in the data structure 924, such customizations may include a "Backgnd color" having a value of "Value1", a "Text color" having a value of "Value2", a "Coupon color" having a value of "Value 3", a "Font" having a value of Value 4, and so on. Any suitable customizations may be stored as customization data 922. In some embodiments, an attribute may have a default value if no value is specified for the attribute in the customization data 922

As described above, when the redemption bar 914 is provided on the merchant webpage 904, the customizations for the redemption bar 914 may be retrieved. Thus, using the example depicted in FIG. 9, the redemption bar 914 may include a background color of "Value1", a text color of "Value2", a coupon code of "Value3", and a font of "Value4." The values may be retrieved and used during providing of the redemption bar 914. Moreover, the attributes and values may be transmitted in any suitable format similar to or different than the data structure 924, such as JSON, XML, or other suitable formats.

In some embodiments, a set of customization data 922 may be stored for each merchant and associated with a merchant identifier. Thus, when the customization data 922 is retrieved, a merchant identifier associated with the merchant webpage 904 may be provided and used to obtain merchant-specific customization attributes and values from the customization data 922. For example, in embodiments, a merchant identifier may be associated with an object having various properties that correspond to the customizable attributes of the redemption header.

The system 900 may also provide for the editing of customization data 922 by an administrator, such as administrator associated with a merchant. For example, a merchant may desire to customize the "look and feel" of the redemption bar 914 to match the merchant website 406, to ensure that a user is made aware of the merchant associated with an offer, to provide merchant-specific instructions to a user, etc. Accordingly, the offers engine 12 may include a web server 926 configured to provide a website 928 for redemption bar customizations. The website 928 may provide, for example, a user interface 930 for viewing and editing the customization data 922. As will be appreciated, an administrator may open the website 928 and edit customization data 922 associated with a merchant, such as by changing a background color, a text color, a coupon color, and so on. An administrator may submit changes in the user interface 930 to the web server 926 such that changes are written to the customization data 922. Consequently, the redemption bar associated with the merchant may be provided with the edited customizations. It should be appreciated that the offers engine 12 may include any suitable components suitable for facilitating the storage, viewing, and editing of customization data, such as database servers, application servers, web servers, network devices, and so on.

Figure 10:
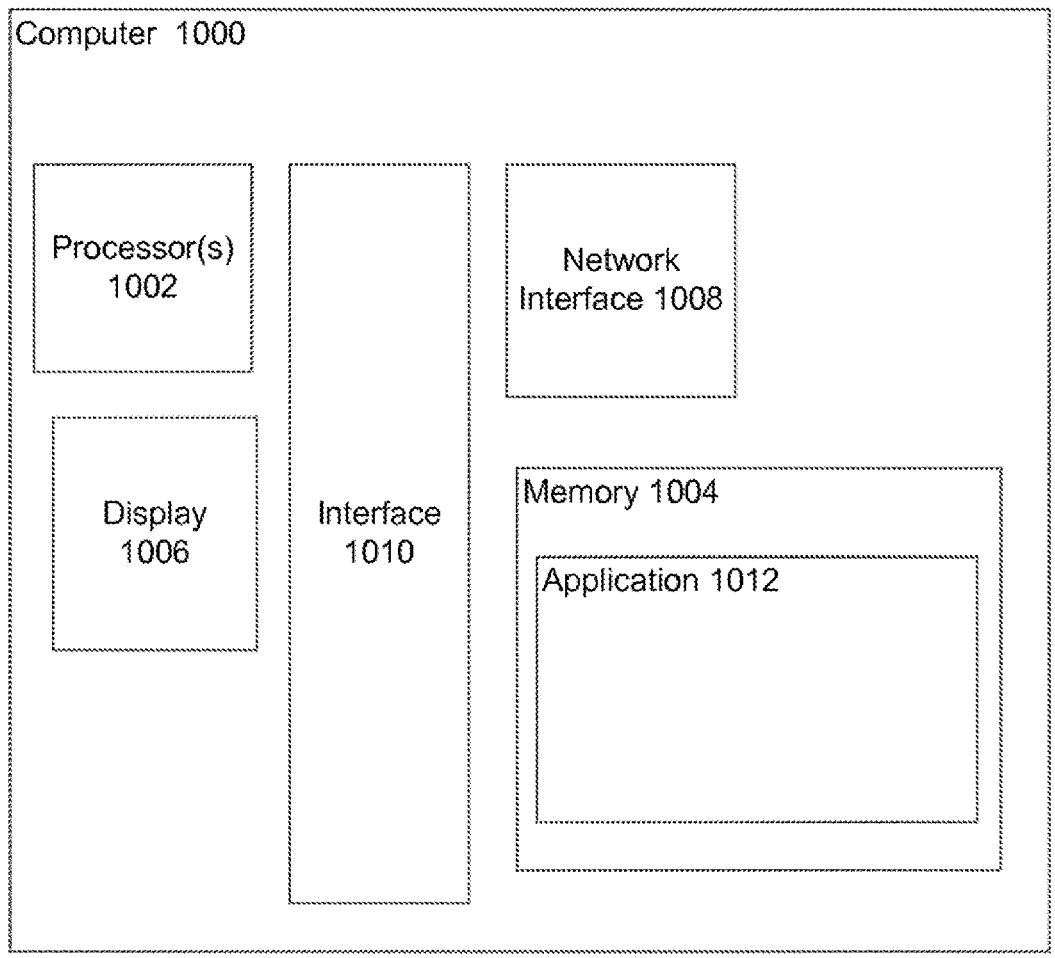
FIG. 10 is a block diagram of a computer in accordance with an embodiment of the present invention.

FIG. 10 depicts of a computer 1000 in accordance with an embodiment of the present invention. Various sections of systems and computer-implemented methods described herein, may include or be executed on one or more computers similar to computer 1000. Further, processes and modules described herein may be executed by one or more processing systems similar to that of computer 1000. The computer 1000 may include various internal and external components that contribute to the function of the device and which may allow the computer 1000 to function in accordance with the techniques discussed herein. It should further be noted that FIG. 10 depicts merely one example of a particular implementation and is intended to illustrate the types of components and functionalities that may be present in computer 1000.

Computer 1000 may include any combination of devices or software that may perform or otherwise provide for the performance of the techniques described herein. For example, computer 1000 may include a tablet, a mobile phone, such as a smartphone, a video game device, and other hand-held networked computing devices, a desktop user device, a server, or other computing devices. Computer 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 1000 may allow a user to connect to and communicate through a network (e.g., the Internet, a local area network, a wide area network, etc.) and may provide communication over a satellite-based positioning system (e.g., GPS). For example, the computer 1000 may allow a user to communicate using e-mail, text messaging, instant messaging, or using other forms of electronic communication, and may allow a user to obtain the location of the device from the satellite-based positioning system, such as the location on an interactive map.

As shown in FIG. 10, the computer 1000 may include a processor 1002 (e.g., one or more processors) coupled to a memory 1004, a display 1006, and a network interface 1008 via an interface 1010. It should be appreciated the computer 1000 may include other components not shown in FIG. 10, such as a power source (e.g., a battery), I/O ports, expansion card interfaces, hardware buttons, etc. In some embodiments, the display 1006 may include a liquid crystal display (LCD) or an organic light emitting diode (OLED) display. The display 1006 may display a user interface (e.g., a graphical user interface), and may also display various function and system indicators to provide feedback to a user, such as power status, call status, memory status, etc. These indicators may be in incorporated into the user interface displayed on the display 1006. In accordance with some embodiments, the display 1006 may include or be provided in conjunction with touch sensitive elements through which a user may interact with the user interface. Such a touch-sensitive display may be referred to as a "touchscreen" and may also be referred to as a touch-sensitive display. In such embodiments, the display 1006 may include a capacitive touchscreen, a resistive touchscreen, or any other suitable touchscreen technology.

The processor 1002 may provide the processing capability required to execute the operating system, programs, user interface, and any functions of the computer 1000. The processor 1002 may include one or more processors that may include "general-purpose" microprocessors and special purpose microprocessors, such as one or more reduced instruction set (RISC) processors, such as those implementing the Advanced RISC Machine (ARM) instruction set. Additionally, the processor 1002 may include single-core processors and multicore processors and may include graphics processors, video processors, and related chip sets. A processor may receive instructions and data from a memory (e.g., system memory 1004). Processes, such as those described herein may be performed by one or more programmable processors executing computer code to perform functions by operating on input data and generating corresponding output.

The memory 1004 (which may include tangible non-transitory computer readable storage mediums) may include volatile memory and non-volatile memory accessible by the processor 1002 and other components of the computer 1000. The memory 1004 may include volatile memory, such as random access memory (RAM), and non-volatile memory, such as ROM, flash memory, a hard drive, any other suitable optical, magnetic, or solid-state storage medium, or a combination thereof. The memory 1004 may store a variety of information and may be used for a variety of purposes. For example, the memory 1004 may store executable code, such as the firmware for the computer 1000, an operating system for the computer 1000, and any other programs. The executable computer code may include instructions executable by a processor, such as processor 1002, and the computer may include instructions for implementing one or more techniques described herein with regard to various processes. For example, the memory 1004 may store an application 1012. For example, if the computer 1000 represents a user device, the application 1012 may include a web browser and may enable a user to view offers, such as online coupons, and select and redeem online coupons using the user actions described above. In other embodiments, for example, the computer 1000 may represent a server and the application 1012 may implement some or all of the processes described above in FIGS. 5A and 5B, 6A and 6B, 7 and 8. The executable code may be written in a programming language, including compiled or interpreted languages, or declarative or procedural language, and may be composed into a unit suitable for use in a computing environment, including as a stand-alone program, a module, a component, a subroutine. Such code program may be stored in a section of a file that holds other programs or data (e.g., one or more scripts stored in a markup language document), in a single file dedicated to the program in question, or in multiple coordinated files (e.g., files that store one or more modules, sub programs, or sections of code). Additionally, the copies of the executable code may be stored in both non-volatile and volatile memories, such as in a non-volatile memory for long-term storage and a volatile memory during execution of the code.

The interface 1010 may include multiple interfaces and may couple various components of the computer 1000 to the processor 1002 and memory 1004. In some embodiments, the interface 1010, the processor 1002, memory 1004, and one or more other components of the computer 1000 may be implemented on a single chip, such as a system-on-a-chip (SOC). In other embodiments, these components, their functionalities, or both may be implemented on separate chips. The interface 1010 may be configured to coordinate I/O traffic between processor 1002, memory 1004, network interface 1006, and other internal and external components of the computer 1000. The interface 1010 may include functionality for interfacing via various types of peripheral buses, such as a variant of the Peripheral Component Interconnect (PCI) bus standard, the Universal Serial Bus (USB) standard, and the like.

The computer 1000 depicted in FIG. 10 also includes a network interface 1008, such as a wired network interface, wireless (e.g., radio frequency) receivers, etc. For example, the network interface 1008 may receive and send electromagnetic signals and communicate with communications networks and other communications devices via the electromagnetic signals. The network interface 1008 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 1004 may communicate with networks, such as the Internet, an intranet, a cellular telephone network, a wireless local area network (LAN), a metropolitan area network (MAN), or other devices by wireless communication. The network interface 1008 may suitable any suitable communications standard, protocol and technology, including Ethernet, Global System for Mobile Communications (GSM), Enhanced Data GSM Environment (EDGE), a 4G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 1002.11a, IEEE 1002.11b, IEEE 1002.11g or IEEE 1002.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-readable medium or a portable article to be read by an appropriate drive, various examples of which are described above. In some embodiments, instructions stored on a computer-readable medium separate from computer 1000 may be transmitted to computer 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer implemented method, comprising:
providing, by one or more processors, on a user device, a first and a second browser instance;
displaying, by one or more processors, in the first browser instance a webpage from a first web domain;
displaying, by one or more processors, in the second browser instance, concurrently with displaying the webpage from the first domain in the first browser instance, data transmitted from a second web domain;
receiving input from a user in the second browser instance, the input indicating selection of one of a plurality of offers associated with a merchant;
evaluating whether the merchant associated with the selected offer matches a merchant associated with the webpage in the first browser instance, and upon a positive evaluation of a match, causing display in the first browser instance of information related to the selected offer;
communicating, via client-side storage accessed by both the first browser instance and the second browser instance to effectuate the communication, from the second browser instance to the first browser instance, an indication of a selection by the user in the second browser instance by:
checking for an occurrence of modification of the client-side storage on multiple occasions, and
reading, upon a check that a modification of the client-side storage has occurred, an offer redemption identifier from the client-side storage; and
displaying, within the first browser instance, in response to the selection by the user in the second browser instance being communicated, a webpage element that was not displayed prior to the selection by the user.

2. The computer implemented method of claim 1, wherein the client-side storage comprises a Local Storage object.

3. The computer implemented method of claim 1, wherein the data describes a plurality of offers, and further comprising storing each of the plurality of offers in a plurality of merchant-offer records, each of the merchant-offer records comprising term and conditions of the plurality of offers.

4. The computer implemented method of claim 1, wherein the webpage from the first web domain displayed in the first browser instance comprises an empty webpage element; and further comprising providing the offer redemption identifier within the empty webpage element.

5. The computer implemented method of claim 1, comprising:
storing in a cookie an offer redemption identifier corresponding to the selection by the user; and
retrieving from the cookie for display in the first browser instance information used to populate a redemption bar associated with the offer redemption identifier.

6. The computer implemented method of claim 1, comprising:
retaining an offer redemption identifier on a plurality of webpages from the first domain.

7. The computer implemented method of claim 6, wherein at least one of the plurality of webpages includes a plurality of fields to receive entered order information, and wherein at least some information associated with the offer redemption identifier is automatically populated into one or more of the fields.

8. The computer implemented method of claim 1, comprising:
verifying transaction data indicates compensation should be paid on the basis of redemption of an offer identified in the selection by the user; and
requesting, upon determining that compensation should be paid, that an affiliate be paid.

9. A non-transitory computer-readable medium having executable computer code stored thereon, the executable computer code comprising instructions that, when executed, cause one or more processors to perform the following:
providing, by one or more processors, on a user device a first and a second browser instance;
displaying, by one or more processors, in the first browser instance a webpage from a first web domain;
displaying, by one or more processors, in the second browser instance, concurrently with displaying the webpage from the first domain in the first browser instance, data transmitted from a second web domain;
receiving input from a user in the second browser instance, the input indicating selection of an offer associated with a merchant;
evaluating whether the merchant associated with the selected offer matches a merchant associated with the webpage in the first browser instance, and upon an evaluation of a match, causing display in the first browser instance of information related to the selected offer;
communicating, via client-side storage accessed by both the first browser instance and the second browser instance to effectuate the communication, from the second browser instance to the first browser instance, an indication of a selection by the user in the second browser instance by:
checking for modification of the client-side storage on multiple occasions, and
reading, upon a check that a modification of the client-side storage has occurred, an offer redemption identifier from the client-side storage; and
displaying, within the first browser instance, in response to the selection by the user in the second browser instance being communicated, a webpage element that was not displayed prior to the selection by the user.

10. The non-transitory computer-readable medium of claim 9, wherein the client-side storage comprises a Local Storage object.

11. The non-transitory computer-readable medium of claim 9, wherein the data describes a plurality of offers, and wherein the executable computer code further comprises instructions that, when executed, cause one or more processors to store each of the plurality of offers in a plurality of merchant-offer records, each of the merchant-offer records comprising term and conditions of the plurality of offers.

12. The non-transitory computer-readable medium of claim 9, wherein the webpage from the first web domain displayed in the first browser instance comprises an empty webpage element, and the executable computer code further comprises instructions that, when executed, cause one or more processors to perform the following:
providing the offer redemption identifier within the empty webpage element.

13. The non-transitory computer-readable medium of claim 9, the executable computer code further comprising instructions that, when executed, cause one or more processors to perform the following:
storing in a cookie an offer redemption identifier corresponding to the selection by the user, said browser-accessible storage item accessible by the first browser instance and the second browser instance; and
retrieving from the cookie for display in the first browser instance information used to populate a redemption bar associated with the offer redemption identifier.

14. The non-transitory computer-readable medium of claim 9, the executable computer code further comprising instructions that, when executed, cause one or more processors to perform the following:
retaining an offer redemption identifier on a plurality of webpages from the first domain.

15. The non-transitory computer-readable medium of claim 14, wherein at least one of the plurality of webpages includes a plurality of fields to receive entered order information, and wherein at least some information associated with the offer redemption identifier is automatically populated into one or more of the fields.

16. The non-transitory computer-readable medium of claim 10, the executable computer code further comprising instructions that, when executed, cause one or more processors to perform the following verifying transaction data indicates compensation should be paid on the basis of redemption of an offer identified in the selection by the user; and
requesting, upon determining that compensation should be paid, that an affiliate be paid.

* * * * *